(12) United States Patent
Bérard et al.

(10) Patent No.: US 12,380,288 B2
(45) Date of Patent: Aug. 5, 2025

(54) MULTILINGUAL UNSUPERVISED NEURAL MACHINE TRANSLATION WITH DENOISING ADAPTERS

(71) Applicant: NAVER CORPORATION, Seongnam-si (KR)

(72) Inventors: Alexandre Bérard, Grenoble (FR); Laurent Besacier, Seyssinet Pariset (FR); Matthias Gallé, Eybens (FR); Ahmet Üstün, Groningen (NL)

(73) Assignee: NAVER CORPORATION, Seongnam-si (KR)

( * ) Notice: Subject to any disclaimer, the term of this patent is extended or adjusted under 35 U.S.C. 154(b) by 184 days.

(21) Appl. No.: 17/931,002

(22) Filed: Sep. 9, 2022

(65) Prior Publication Data

US 2023/0214605 A1    Jul. 6, 2023

Related U.S. Application Data

(60) Provisional application No. 63/266,243, filed on Dec. 30, 2021.

(51) Int. Cl.
| | |
|---|---|
| *G06F 40/58* | (2020.01) |
| *G06F 40/126* | (2020.01) |
| *G06F 40/47* | (2020.01) |
| *G06N 3/088* | (2023.01) |

(52) U.S. Cl.
CPC ............ *G06F 40/58* (2020.01); *G06F 40/126* (2020.01); *G06F 40/47* (2020.01); *G06N 3/088* (2013.01)

(58) Field of Classification Search
None
See application file for complete search history.

(56) References Cited

U.S. PATENT DOCUMENTS

2022/0147721 A1\*    5/2022  Galle .................. G06N 3/08

OTHER PUBLICATIONS

Guo, Junliang, et al. "Incorporating bert into parallel sequence decoding with adapters." Advances in Neural Information Processing Systems 33 (2020): 10843-10854. (Year: 2020).\*

Aharoni, R., et al., "Massively Multilingual Neural Machine Translation," Proceedings of the 2019 Conference of the North American Chapter of the Association for Computational Linguistics, Jun. 2-7, 2019, pp. 3874-3884.

Arivazhagan, N., et al., "Massively Multilingual Neural Machine Translation in the Wild: Findings and Challenges," published on arXiv.org as 1907.05019, Jul. 11, 2019, 27 pages.

(Continued)

*Primary Examiner* — Douglas Godbold
(74) *Attorney, Agent, or Firm* — Greer, Burns & Crain, Ltd

(57) ABSTRACT

Methods and systems for unsupervised training for a neural multilingual sequence-to-sequence (seq2seq) model. Denoising adapters for each of one or more languages is inserted into an encoder and/or a decoder of the seq2seq model. Parameters of the one or more denoising adapters are trained on a language-specific denoising task using monolingual text for each of the one or more languages. Cross-attention weights of the seq2seq model with the trained denoising adapter layers are fine-tuned on a translation task in at least one of the one or more languages with parallel data.

33 Claims, 15 Drawing Sheets

(56) References Cited

OTHER PUBLICATIONS

Artetxe, M., et al., "An Effective Approach to Unsupervised Machine Translation," Proceedings of the 57th Annual Meeting of the Association for Computational Linguistics, Florence, Italy: Jul. 28-Aug. 2, 2019, pp. 194-203.

Artetxe, M., et al., "Unsupervised Neural Machine Translation," published on arXiv.org as 1770.11041, Feb. 26, 2018, 12 pages.

Attardi, G., "Wikiextractor," retrieved on the Internet at: https://github.com/attardi/wikiextractor., 2015, 1 page.

Bapna, A., et al., "Simple, Scalable Adaptation for Neural Machine Translation," Proceedings of the 2019 Conference on Empirical Methods in Natural Language Processing and the 9th International Joint Conference on Natural Language Processing (EMNLP-IJCNLP), Nov. 3-7, 2019, pp. 1538-1548.

Conneau, A., et al., "Unsupervised Cross-Lingual Representation Learning at Scale," Proceedings of the 58th Annual Meeting of the Association for Computational Linguistics, Jul. 5-10, 2020 pp. 8440-8451.

Firat, O., et al., "Multi-Way, Multilingual Neural Machine Translation with a Shared Attention Mechanism," Proceedings of the 2016 Conference of the North American Chapter of the Association for Computational Linguistics: Human Language Technologies, San Diego, Jun. 12-17, 2016, pp. 866-875.

Garcia, X., et al., "Harnessing Multilinguality in Unsupervised Machine Translation for Rare Languages," published on arXiv.org as 2009.11201, Mar. 12, 2021, 12 pages.

Guzmán, F., et al., "The FLORES Evaluation Datasets for Low-Resource Machine Translation: Nepali-English and Sinhala-English," Proceedings of the 2019 Conference on Empirical Methods in Natural Language Processing and the 9th International Joint Conference on Natural Language Processing (EMNLP-IJCNLP), Nov. 3-7, 2019, pp. 6098-6111.

Ha, T., et al., "Toward Multilingual Neural Machine Translation with Universal Encoder and Decoder," published on arXiv.org as 1611.04798, Nov. 15, 2016, 10 pages.

Houlsby, N., et al., "Parameter-Efficient Transfer Learning for NLP," proceedings of the 36th International Conference on Machine Learning 2019, published on arXiv.org as 1902.00751, Jun. 13, 2019, 13 pages.

Johnson, M., et al., "Google's Multilingual Neural Machine Translation System: Enabling Zero-Shot Translation," Transactions of the Association for Computational Linguistics 5, Dec. 2017, pp. 339-351.

Kingma, D., et al., "Adam: A Method for Stochastic Optimization," published as a conference paper at ICLR 2015, available on arXiv.org as 1412.6980, Jan. 30, 2017, 15 pages.

Kudo, T., et al., "SentencePiece: A Simple and Language Independent Subword Tokenizer and Detokenizer for Neural Text Processing," Proceedings of the 2018 Conference on Empirical Methods in Natural Language Processing: System Demonstrations, Oct. 31-Nov. 4, 2018, pp. 66-71.

Kunchukuttan, A., et al., "The IIT Bombay English-Hindi Parallel Corpus," published on arXiv.org as 1710.02855, May 19, 2018, 4 pages.

Lample, G., et al., "Cross-Lingual Language Model Pretraining," published on arXiv.org as 1901.07291, Jan. 22, 2019, 10 pages.

Lample, G., et al., "Unsupervised Machine Translation Using Monolingual Corpora Only," published as a conference paper at ICRL 2018, available on arXiv.org as 1711.00043, Apr. 13, 2018, 14 pages.

Lewis, M., et al., "BART: Denoising Sequence-to-Sequence Pre-Training for Natural Language Generation, Translation, and Comprehension," Proceedings of the 58th Annual Meeting of the Association for Computational Linguistics, Jul. 5-10, 2020, pp. 7871-7880.

Li, Z., et al., "Reference Language Based Unsupervised Neural Machine Translation," Findings of the Association for Computational Linguistics: EMNLP, Nov. 16-20, 2020, pp. 4151-4162.

Liu, Y., et al., "Multilingual Denoising Pre-Training for Neural Machine Translation," Transactions of the Association for Computational Linguistics 8, Nov. 2020, pp. 726-742.

Ott, M., et al., "Fairseq: A Fast, Extensible Toolkit for Sequence Modeling," Proceedings of the 2019 Conference of the North, Minneapolis, Minnesota: Association for Computational Linguistics, Jun. 2-7, 2019, pp. 48-53.

Ott, M., et al., "Scaling Neural Machine Translation," Proceedings of the Third Conference on Machine Translation: Research Papers, Oct. 31-Nov. 1, 2018, pp. 1-9.

Pfeiffer, J., et al., "MAD-X: An Adapter-Based Framework for Multi-Task Cross-Lingual Transfer," Proceedings of the 2020 Conference on Empirical Methods in Natural Language Processing (EMNLP), Online: Association for Computational Linguistics, 2020, pp. 7654-7673.

Philip, J., et al., "Monolingual Adapters for Zero-Shot Neural Machine Translation," Proceedings of the 2020 Conference on Empirical Methods in Natural Language Processing (EMNLP), Nov. 16-20, 2020, pp. 4465-4470.

Popović, M. "CHRF: Character n-gram F-Score for automatic MT evaluation," Proceedings of the Tenth Workshop on Statistical Machine Translation, Sept. 17-18, 2015, pp. 392-395.

Post, M., "A Call for Clarity in Reporting BLEU Scores," Proceedings of the Third Conference on Machine Translation: Research Papers, Oct. 31-Nov. 1, 2018, pp. 186-191.

Qi, Y., et al., "When and Why Are Pre-Trained Word Embeddings Useful for Neural Machine Translation?," Proceedings of the 2018 Conference of the North American Chapter of the Association for Computational Linguistics: Human Language Technologies, vol. 2 (Short Papers), Jun. 1-6, 2018, pp. 529-535.

Rebuffi, S., et al., "Efficient Parametrization of Multi-Domain Deep Neural Networks," 2018 IEEE/CVF Conference on Computer Vision and Pattern Recognition, 2018, pp. 8119-8127.

Rei, R., et al., "COMET: A Neural Framework for MT Evaluation," Proceedings of the 2020 Conference on Empirical Methods in Natural Language Processing (EMNLP), Nov. 16-20, 2020, pp. 2685-2702.

Sen, S., et al., "Multilingual Unsupervised NMT Using Shared Encoder and Language-Specific Decoders," Proceedings of the 57th Annual Meeting of the Association for Computational Linguistics, Jul. 28-Aug. 2, 2019, pp. 3083-3089.

Sennrich, R., et al., "Improving Neural Machine Translation Models with Monolingual Data," Proceedings of the 54th Annual Meeting of the Association for Computational Linguistics (vol. 1: Long Papers), Aug. 7-12, 2016, pp. 86-96.

Stickland, A., et al., "BERT and PALs: Projected Attention Layers for Efficient Adaptation in Multi-Task Learning," Proceedings of the 36th International Conference on Machine Learning, 2019, 10 pages.

Stickland, A., et al., "Recipes for Adapting Pre-trained Monolingual and Multilingual Models to Machine Translation," Proceedings of the 16th Conference of the European Chapter of the Association for Computational Linguistics, Apr. 19-23, 2021, pp. 3440-3453.

Sun, H., et al., "Knowledge Distillation for Multilingual Unsupervised Neural Machine Translation," Proceedings of the 58th Annual Meeting of the Association for Computational Linguistics, Jul. 5-10, 2020, pp. 3525-3535.

Tang, Y., et al., "Multilingual Translation with Extensible Multilingual Pretraining and Finetuning," published on arXiv.org as 2008.00401, Aug. 2, 2020, 15 pages.

Üstün, A., et al., "UDapter: Language Adaptation for Truly Universal Dependency Parsing," Proceedings of the 2020 Conference on Empirical Methods in Natural Language Processing (EMNLP), Nov. 16-20, 2020, pp. 2302-2315.

Vaswani, A., et al., "Attention Is All You Need," 31st Conference on Neural Information Processing Systems (NIPS 2017), available on arXiv.org as 1706.03762, Dec. 6, 2017, 15 pages.

Wang, M., et al., "Cross-Lingual Supervision Improves Unsupervised Neural Machine Translation," published on arXiv:2004.03137v3, Apr. 1, 2021, 8 pages.

(56) References Cited

OTHER PUBLICATIONS

Zhang, T., et al., "Bertscore: Evaluating text generation with BERT," International Conference on Learning Representations, 2020, 43 pages.

* cited by examiner

| | | | | | en → zz | | | | | | | |
|---|---|---|---|---|---|---|---|---|---|---|---|---|
| | | es | nl | hr | uk | sv | lt | id | fi | et | ur | kk | AVG-11 |
| (1) | BILINGUAL | 43.4 | 38.2 | 35.4 | 27.4 | 36.8 | 20.0 | 31.3 | 13.4 | 8.0 | 4.0 | 2.1 | 23.6 |
| (2) | MBART-FT | 39.8 | 32.8 | 26.7 | 26.6 | 30.0 | 21.0 | 22.6 | 19.7 | 16.8 | 9.2 | 9.6 | 23.2 |
| | TASK ADAPTERS | 42.0 | 35.5 | 32.9 | 30.8 | 38.0 | 25.4 | 33.4 | 22.5 | 21.6 | 20.0 | 12.9 | 28.6 |
| | DENOIS. ADAPTERS | 42.3 | 37.0 | 38.0 | 31.1 | 42.2 | 31.2 | 34.8 | 25.2 | 28.6 | 24.3 | 15.6 | 31.8 |
| (3) | MBART-FT | 40.4 | 33.6 | 27.0 | 27.4 | 32.5 | 22.1 | 24.5 | 21.6 | 18.0 | 6.6 | 10.0 | 24.0 |
| | TASK ADAPTERS | 42.2 | 35.9 | 33.5 | 30.9 | 39.2 | 25.5 | 33.5 | 23.6 | 22.2 | 18.3 | 13.2 | 28.9 |
| | DENOIS. ADAPTERS | 42.3 | 37.8 | 39.0 | 31.6 | 42.6 | 31.2 | 35.1 | 25.7 | 29.3 | 21.8 | 16.4 | 32.0 |

| | | | | | zz → en | | | | | | | |
|---|---|---|---|---|---|---|---|---|---|---|---|---|
| | | es | nl | hr | uk | sv | lt | id | fi | et | ur | kk | AVG-11 |
| (1) | BILINGUAL | 40.3 | 32.8 | 27.6 | 19.9 | 31.5 | 13.2 | 21.4 | 9.5 | 6.8 | 2.4 | 0.4 | 19.5 |
| (2) | MBART-FT | 1.3 | 1.9 | 1.8 | 0.8 | 1.6 | 0.9 | 1.6 | 1.4 | 0.7 | 0.6 | 0.4 | 1.3 |
| | TASK ADAPTERS | 2.0 | 2.0 | 2.1 | 1.0 | 1.5 | 0.9 | 0.8 | 1.6 | 1.1 | 0.9 | 0.5 | 1.4 |
| | DENOIS. ADAPTERS | 28.4 | 21.6 | 19.0 | 12.2 | 22.9 | 11.0 | 23.8 | 10.1 | 12.7 | 9.6 | 3.8 | 15.9 |
| (3) | MBART-FT | 30.9 | 22.0 | 20.0 | 14.2 | 22.7 | 13.7 | 20.2 | 9.4 | 14.1 | 5.7 | 3.5 | 16.3 |
| | TASK ADAPTERS | 31.5 | 22.4 | 21.9 | 15.7 | 25.3 | 14.6 | 22.9 | 10.1 | 15.2 | 9.4 | 4.2 | 17.6 |
| | DENOIS. ADAPTERS | 32.2 | 22.9 | 23.1 | 15.4 | 27.1 | 16.3 | 24.4 | 11.7 | 17.1 | 11.7 | 4.9 | 18.9 |

FIG. 8

| | zz → en | | | | | | | en → zz | | | | | | |
|---|---|---|---|---|---|---|---|---|---|---|---|---|---|---|
| | bg | hu | sr | el | da | be | AVG-6 | bg | hu | sr | el | da | be | AVG-6 |
| BILINGUAL | 40.7 | 27.3 | 34.2 | 38.7 | 41.1 | 3.12 | 30.9 | 35.1 | 19.2 | 21.3 | 32.2 | 36.4 | 2.14 | 24.4 |
| MBART-FT | 8.8 | 1.0 | 18.9 | 0.2 | 5.2 | 2.8 | 6.2 | - | - | - | - | - | - | - |
| TASK A. | 11.9 | 1.3 | 24.8 | 0.5 | 8.3 | 4.6 | 8.6 | - | - | - | - | - | - | - |
| DENOIS. A. | 39.8 | 27.5 | 36.9 | 34.6 | 45.5 | 28.4 | 35.5 | 24.1 | 11.1 | 8.6 | 16.1 | 25.7 | 12.1 | 16.3 |

FIG. 10

| | ar | he | ru | it | fr | pl | vi | de | fa | cs | hi | AVG-20 |
|---|---|---|---|---|---|---|---|---|---|---|---|---|
| xx → en | | | | | | | | | | | | |
| BILINGUAL | 33.0 | 39.0 | 26.0 | 39.7 | 41.7 | 25.5 | 28.3 | 37.4 | 28.9 | 28.7 | 9.7 | 28.0 |
| MBART-FT | 35.2 | 40.4 | 29.2 | 42.5 | 44.2 | 29.0 | 31.2 | 40.9 | 33.7 | 34.7 | 31.6 | 33.0 |
| TASK ADAPTERS | 33.5 | 38.9 | 28.8 | 41.9 | 43.9 | 28.4 | 31.1 | 40.3 | 32.3 | 34.4 | 30.6 | 32.3 |
| LANG. ADAPTERS | 35.2 | 40.5 | 29.1 | 42.6 | 44.4 | 29.1 | 31.5 | 41.3 | 33.3 | 35.0 | 30.0 | 32.9 |
| DENOIS. ADAPTERS | 32.6 | 38.0 | 27.6 | 41.0 | 42.9 | 27.6 | 29.9 | 39.3 | 31.2 | 34.0 | 27.1 | 30.5 |
| en → xx | | | | | | | | | | | | |
| BILINGUAL | 17.2 | 27.5 | 20.5 | 35.4 | 40.7 | 16.5 | 29.4 | 30.0 | 15.0 | 20.8 | 10.7 | 22.2 |
| MBART-FT | 16.6 | 25.8 | 21.6 | 36.8 | 41.6 | 19.1 | 31.2 | 31.8 | 16.8 | 23.3 | 22.2 | 24.5 |
| TASK ADAPTERS | 15.6 | 24.3 | 21.1 | 35.8 | 41.0 | 18.2 | 30.4 | 31.0 | 16.4 | 22.4 | 22.3 | 23.8 |
| LANG. ADAPTERS | 16.0 | 24.9 | 21.1 | 36.0 | 41.2 | 18.8 | 30.8 | 31.2 | 16.6 | 22.7 | 21.4 | 24.0 |
| DENOIS. ADAPTERS | 14.4 | 21.5 | 19.5 | 33.1 | 38.8 | 17.3 | 29.5 | 28.9 | 15.3 | 21.2 | 17.8 | 21.7 |

FIG. 11

| FLoRes devtest | ne | | | | si | | | |
|---|---|---|---|---|---|---|---|---|
| | BLEU | CHRF | COMET | BERTSCORE | BLEU | CHRF | COMET | BERTSCORE |
| MBART (Liu et al., 2020) | 17.9* | - | - | - | 8.1* | - | - | - |
| MBART-FT | 15.7 | 42.6 | 19.6 | 49.1 | 7.6 | 32.4 | -6.0 | 37.4 |
| DENOIS. ADAPT. | 18.1 | 44.0 | 31.5 | 54.8 | 11.4 | 37.0 | 15.0 | 46.3 |

FIG. 13

MULTILINGUAL UNSUPERVISED NEURAL MACHINE TRANSLATION WITH DENOISING ADAPTERS

PRIORITY CLAIM

This application claims priority to and benefit from U.S. Provisional Patent Application Ser. No. 63/266,243, filed Dec. 30, 2021, which application is incorporated in its entirety by reference herein.

FIELD

The present disclosure relates generally to machine learning, and more particularly to methods and systems for training neural sequence-to-sequence (seq2seq) models for machine translation.

BACKGROUND

Recent Neural Machine Translation (NMT) systems have been disclosed that are based on Multilingual Neural Machine Translation (MNMT) or Unsupervised Neural Machine Translation (UNMT) principles.

Multilingual Neural Machine Translation (MNMT) (e.g., as disclosed in Firat et al., Multi-way, multilingual neural machine translation with a shared attention mechanism, in Proceedings of the 2016 Conference of the North American Chapter of the Association for Computational Linguistics: Human Language Technologies, pages 866-875, 2016; Ha et al., Toward multilingual neural machine translation with universal encoder and decoder, 2017; Johnson et al., Google's multilingual neural machine translation system: Enabling zero-shot translation. Transactions of the Association for Computational Linguistics, 5:339-351, 2017; and Aharoni et al., Massively multilingual neural machine translation, In Proceedings of the 2019 Conference of the North American Chapter of the Association for Computational Linguistics: Human Language Technologies, Volume 1 (Long and Short Papers), pages 3874-3884. 2019) has achieved impressive results on large-scale multilingual benchmarks with diverse sets of language pairs. MNMT methods have the advantage of resulting in only one model to maintain, as well as benefitting from cross-lingual knowledge transfer.

UNMT (e.g., as disclosed in Lample et al., Unsupervised machine translation using monolingual corpora only, In International Conference on Learning Representations, 2018; and Artexte et al., Unsupervised neural machine translation, in 6th International Conference on Learning Representations, ICLR 2018) allows for training of translation systems from monolingual data only. However, training bilingual UNMT systems often assumes high-quality in-domain monolingual data and is mostly limited to resource-rich languages. Further, in addition to pretraining and denoising autoencoding, UNMT systems require one or more computationally expensive steps of back-translation to create an artificial parallel training corpus.

Multilingual Unsupervised NMT (mUNMT) aims at combining principles of both UNMT and MNMT. mUNMT is directed to the problem of learning both from parallel data centered in one language (e.g., English) as well as from monolingual data for translating between the center language and any of the provided languages. The end model is intended to translate to/from English in auxiliary and unsupervised languages.

Prior mUNMT methods, e.g., as disclosed in Sen et al., Multilingual unsupervised NMT using shared encoder and language specific decoders. In Proceedings of the 57th Annual Meeting of the Association for Computational Linguistics, pages 3083-3089, Florence, Italy. Association for Computational Linguistics, 2019, train a single shared model for multiple language pairs by using a denoising autoencoder and back-translation. Sun et al., Knowledge distillation for multilingual unsupervised neural machine translation. In Proceedings of the 58th Annual Meeting of the Association for Computational Linguistics, pages 3525-3535, Online. Association for Computational Linguistics, 2020, further proposed using knowledge distillation to enhance multilingual unsupervised translation.

However, current multilingual UNMT methods rely on back-translation, either offline or online. This is computationally costly, and it requires significant design effort when applied to large-scale setups.

SUMMARY

Provided herein, among other things, are methods and systems for unsupervised training for a neural multilingual sequence-to-sequence (seq2seq) model (i.e., a model trained to convert sequences from one domain to another domain; e.g., converting a sentence in one language to a sentence in another language). One or more denoising adapters for each of one or more languages is inserted, e.g., in a memory accessed by one or more processors, into an encoder and/or a decoder of the seq2seq model. Parameters of each of the one or more denoising adapters are trained e.g., by one or more processors, on a language-specific denoising task using monolingual text for each of the one or more languages. Cross-attention weights of the seq2seq model are fine-tuned e.g., by one or more processors, with the denoising adapter layers and the trained parameters on a translation task in at least one of the one or more languages with parallel data.

Other embodiments provide, among other things, a system for neural multilingual machine translation in a set of languages, the system being implemented by a processor and a memory. A transformer encoder comprises a feedforward encoder layer and a self-attention layer having a plurality of attention heads. An autoregressive transformer decoder comprises a feedforward decoder layer, a self-attention layer having a plurality of attention heads, and a cross-attention layer. At least one denoising adapter for each of one or more languages in the set of languages is inserted into the transformer encoder and/or the transformer decoder. Each of the denoising adapters is trained on a language-specific denoising task for its respective language using monolingual data in the respective language. The cross-attention layer of the decoder is trained using parallel data in at least one of the one or more languages in the set of languages when the denoising adapters are inserted into the transformer encoder and/or the transformer decoder.

According to a complementary aspect, the present disclosure provides a computer program product, comprising code instructions to execute a method according to the previously described aspects; and a computer-readable medium, on which is stored a computer program product comprising code instructions for executing a method according to the previously described embodiments and aspects. The present disclosure further provides a processor configured using code instructions for executing a method according to the previously described embodiments and aspects.

Other features and advantages of the invention will be apparent from the following specification taken in conjunction with the following drawings.

DESCRIPTION OF THE DRAWINGS

The accompanying drawings are incorporated into the specification for the purpose of explaining the principles of the embodiments. The drawings are not to be construed as limiting the invention to only the illustrated and described embodiments or to how they can be made and used. Further features and advantages will become apparent from the following and, more particularly, from the description of the embodiments as illustrated in the accompanying drawings, wherein:

FIG. 8 shows experimental translation results for 11 languages that have no parallel data, in both zz→en and en→zz directions.

FIG. 10 shows results in both directions for bilingual baselines and other mBART variants that were fine-tuned with only auxiliary parallel data in experiments.

FIG. 11 shows experimental supervised translation results to and from English for auxiliary languages (12 representative languages).

FIG. 13 shows experimental unsupervised translation results on FLoRes devtest sets. MBART-FT and DENOISING ADAPTERS were trained only on Hindi-English. mBART-50 was used for the replication of MBART-FT and DENOISING ADAPTERS. The MBART results were taken from the disclosure Liu et al., 2020, while the other evaluation results were generated from the experiments.

In the drawings, reference numbers may be reused to identify similar and/or identical elements.

DETAILED DESCRIPTION

Introduction

Figure 1:
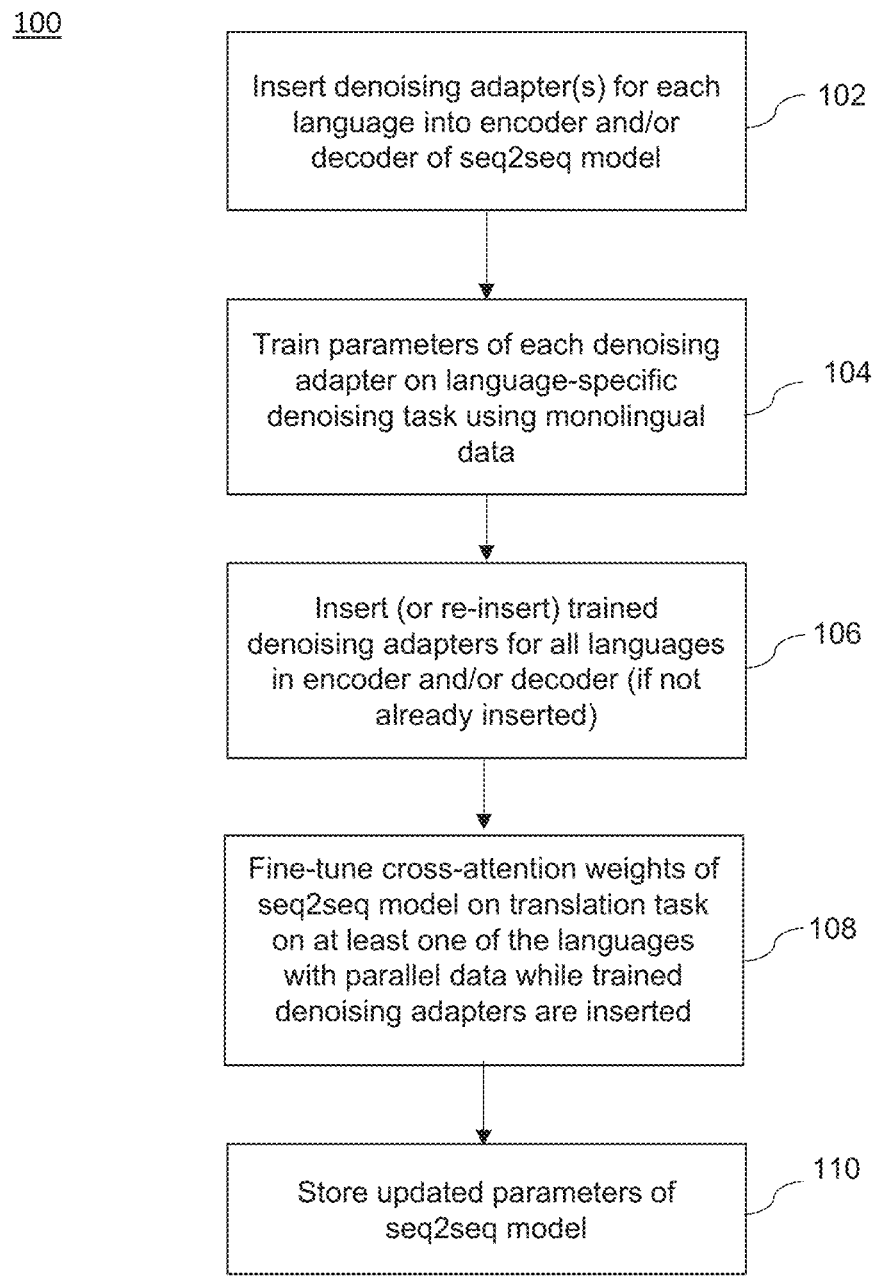
FIG. 1 shows an example method for unsupervised training of a neural multilingual sequence-to-sequence (seq2seq) model according to example embodiments.

Example methods and systems herein provide, among other things, multilingual unsupervised machine translation (UNMT) using denoising adapters, and methods for training UNMT-based models. Denoising adapters are adapter modules or adapter layers with a denoising objective. Denoising autoencoder tasks with monolingual data are not believed to have previously been used to train adapter layers for multiple languages.

By providing denoising adapters that are monolingually-trained language adapters, dependence on parallel data can be avoided. Denoising adapters allow learning and localizing general-purpose language-specific representations on top of pretrained seq2seq models, e.g., machine translation models. Example denoising adapters can then easily be used for multilingual MT, including unsupervised MT, without the need for back-translation.

Example seq2seq models can provide translation to and from languages that exclusively have monolingual data by using parallel language pairs. Example training methods are particularly useful for low-resource languages, and even for very low-resource languages, though example methods are not necessarily limited to these. Example methods and systems can address the significant problem of how to exploit the abundant monolingual data of languages with limited bilingual resources (a form of low resource) in an elegant and novel way by exploiting an underlying denoising mechanism of a multilingual neural machine translation to train on monolingual data.

Some existing training methods use certain adapters for specific languages, but these methods require bilingual data in some form for those languages. Known methods for leveraging monolingual data in multilingual UNMT have required back-translation, which is computationally costly and difficult to tune. By contrast, example methods herein use monolingually trained denoising adapters in combination with a machine translation model to adapt the machine translation model for multilingual translation.

Example denoising adapters include lightweight adapter modules inserted into a model and trained with a denoising objective on monolingual data for each language separately. The denoising adapters can then be combined with multilingual transfer learning on parallel data.

In a first stage of an example two-stage training process for multilingual unsupervised machine translation (MT) models, denoising adapters within an MT model are trained separately on each language's monolingual data. A second stage fine-tunes the cross-attention of the MT model augmented with the denoising adapters.

Example training methods can provide for modular multilingual unsupervised NMT without the need for back-translation and can be used in place of back-translation in example methods. However, example denoising adapters are complementary with back-translation, and using them jointly can further improve translation quality.

Example denoising adapters embodied in monolingually-trained adapter layers can leverage monolingual data for unsupervised machine translation using neural sequence-to-sequence (seq2seq) models. Experiments on a large set of language pairs demonstrated effectiveness of denoising adapters with and without back-translation. Example methods additionally can use denoising adapters to extend trained machine translation models incrementally with new languages, allowing for flexible models that can be extended in a straightforward manner to translate the new languages by plugging in new adapter layers. Example methods and systems further can provide competitive performance in supervised translation in a multilingual NMT setup.

Method for Training Neural Multilingual Seq2Seq Model

FIG. 1 shows an example method 100 for unsupervised training of a neural multilingual sequence-to-sequence (seq2seq) model. Generally, training begins by initializing parameters of the model, e.g., weights and biases, which are then iteratively adjusted after evaluating an output result produced by the model for a given input against the expected output. An example multilingual seq2seq model can include or be embodied in a machine translation model such as a multilingual neural machine translation (MNMT) model. Multilingual models can be trained for translating between two languages (bilingual) or trained for translating among more than two languages.

Figure 2:
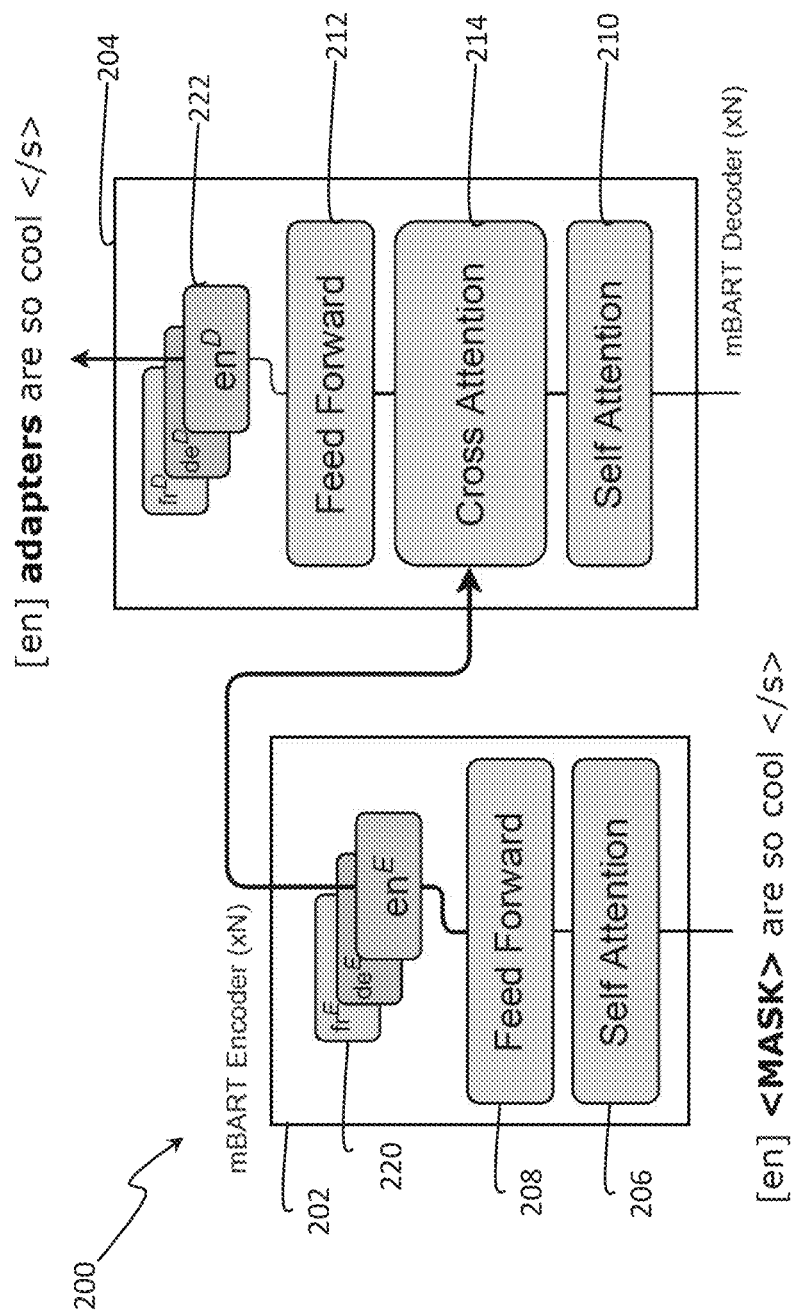
FIG. 2 shows an architecture of an example seq2seq model according to example embodiments, including inserted denoising adapters trained on monolingual data.

An example multilingual seq2seq model is a transformer-based model, such as the seq2seq model 200 shown in FIG. 2. Example transformer architectures are disclosed, for instance, in Vaswani et al., Attention is all you need, in Advances in neural information processing systems, pages 5998-6008, 2017.

The seq2seq model 200 includes a transformer encoder (encoder) 202 connected to a transformer decoder (decoder) 204. The transformer encoder 202 includes a self-attention layer 206, e.g., having a plurality of attention heads, and a feed forward encoder layer 208. The transformer decoder 204 includes a self-attention layer 210, e.g., having a plurality of attention heads, and a decoder feed forward layer 212, and further includes a cross-attention layer 214 provided between the self-attention layer 210 and decoder feed forward layer 212.

The transformer encoder 202 is configured to generate an internal or hidden representation of an input sequence (e.g., of tokens) that is in a first language, and the transformer decoder 204 is configured to generate an output sequence (e.g., of tokens) in a second language, e.g., a target language. The first language can be, for instance, a source language, and the second language can be a target language. The hidden representation of the input sequence generated by the encoder 202 can be embodied in context-sensitive embeddings of the input sequence.

The seq2seq model 200 may (but not necessarily) be pretrained for translating from an input sequence in a first, source language to an output sequence in a second, target language. The source language and target language can each be taken from a set of languages.

To adapt the seq2seq model 200 to a (e.g., downstream) task of multilingual translation, one or more denoising adapters (adapters) 220, 222 for each of one or more languages is inserted at 102 into (i.e., added to) the seq2seq model. Adapter modules (adapters) generally are configured to adapt pretrained models to a downstream task with lightweight residual layers that are inserted into layers of the model. The adapter layers can be trained on a downstream task's data while keeping the parameters of the original pretrained model (e.g., parent model) frozen. This allows a high degree of parameter sharing and can avoid catastrophic forgetting of the knowledge learned during pretraining, though it is contemplated that one or more parameters of the original pretrained model could be updated.

For example, the denoising adapters 220, 222 can be inserted into the encoder 202 and/or the decoder 204, respectively, of the seq2seq model 200. FIG. 2 shows three example denoising adapters 220, for each of French, German, and English, which are inserted into the encoder 202, and three example denoising adapters 222, for each of French, German, and English, which are inserted into the decoder 204.

Figure 3:
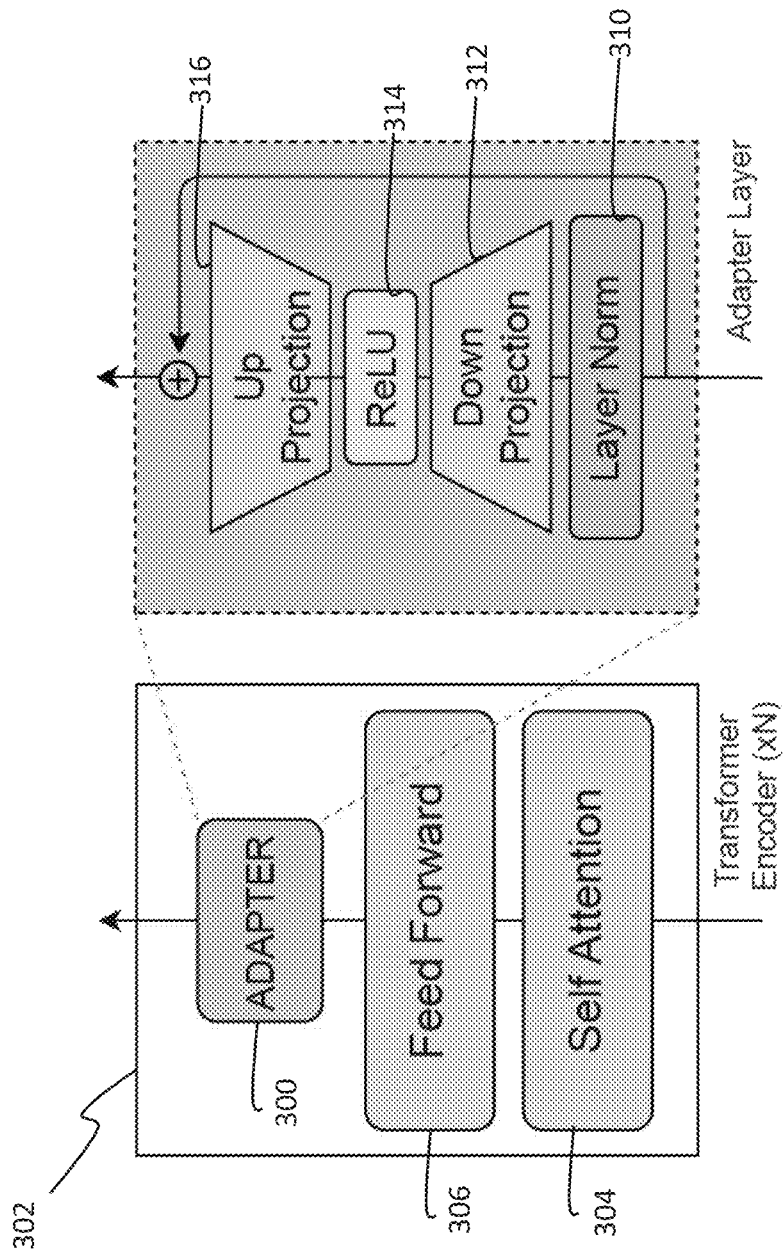
FIG. 3 shows features of an example denoising adapter according to example embodiments.

FIG. 3 shows features of an example denoising adapter 300 such as the denoising adapters 220, 222. The denoising adapter 300 is embodied in an adapter layer that is inserted into (i.e., added to) a transformer encoder 302 having a self-attention layer 304 and a feed forward layer 306 (as shown, following the self-attention and feed forward layers 304, 306). In an example inserting step 102, the output of the transformer encoder 302 including the denoising adapter 300 can be fed to the input of the cross-attention layer 214 of the decoder 204.

The denoising adapter 300 can include lightweight residual layers, such as a normalization layer 310, a down projection layer 312, an activation layer (e.g., ReLU) 314, and an up-projection layer 316. An input to the denoising adapter 300, e.g., from the feed forward layer 306, can be combined (e.g., summed) with an output of the up-projection layer 316 via a residual connection.

Referring again to FIG. 2, the seq2seq model 200 may be pretrained for translating none, some, or all of the (one or more) languages for which the denoising adapters 220, 222 are inserted. For instance, the seq2seq model 200 may be pretrained for translating from a sequence in a source language to a sequence in a target language, where the source and target languages are taken from a set of languages for which the seq2seq model is pretrained, and one or more of the one or more languages for which denoising adapters 220, 222 are inserted, up to and including all of the one or more languages, may be in the set of languages.

Alternatively, the seq2seq model 200 may not be pretrained for translating any of the one or more languages for which denoising adapters 220, 222 are inserted, and each of the one or more languages can provide a new language for the seq2seq model. For instance, the seq2seq model 200 may be pretrained for translating from a sequence in a source language to a sequence in a target language, wherein the source and target languages are taken from a set of languages for which the seq2seq model is pretrained, and none of the (one or more) languages for which denoising adapters 220, 222 are inserted is in the set of languages. As another alternative, the seq2seq model may not be pretrained for translating any languages. The seq2seq model 200, however, may still include or have access to a vocabulary of tokens for languages, including new languages.

The one or more languages can include, for instance, languages for which there is an interest for the trained seq2seq model 200 to translate, and/or one or more auxiliary languages that can be provided primarily to train the model. Further, the one or more languages can include languages for which parallel data is available and will be used for training (parallel languages), and/or languages for which only monolingual data is available or will be used for training (unsupervised languages).

Figure 4:
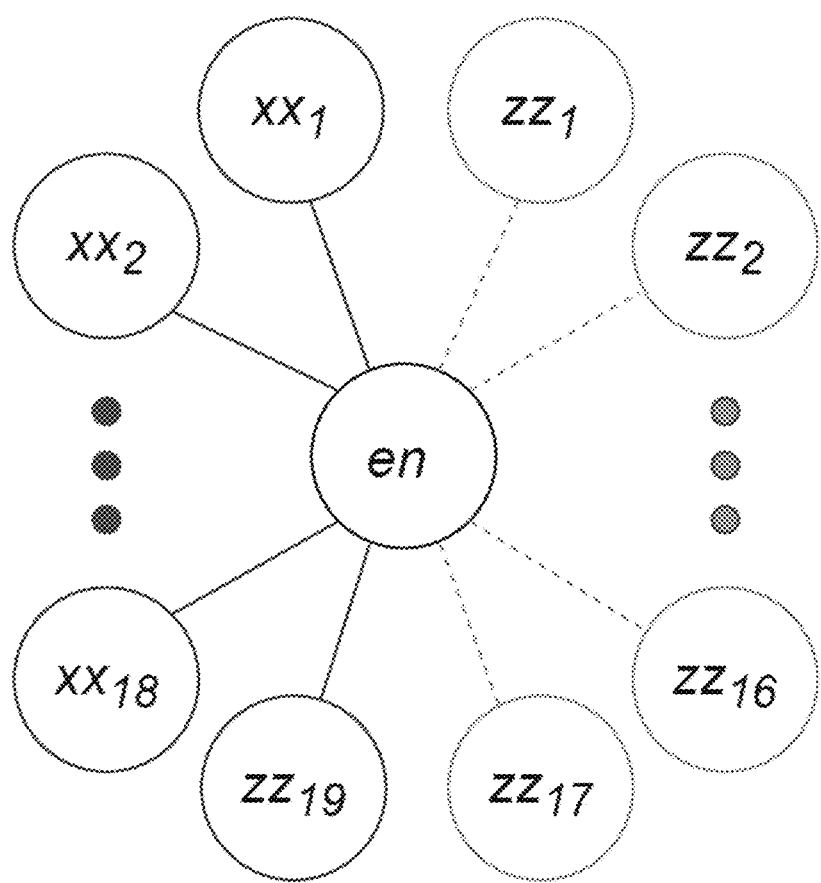
FIG. 4 illustrates an example set of languages for a multilingual unsupervised NMT setup, where dashed lines indicate 17 unsupervised languages without parallel data ($zz_n$) and full lines indicate 19 auxiliary languages with parallel data for training ($xx_n$).

FIG. 4 shows a set of example languages for a multilingual unsupervised NMT setup. In FIG. 4, each of a set of parallel languages, for instance, auxiliary languages $xx_1 \ldots xx_{19}$, has access to parallel data paired with a common or central language, e.g., English (en↔$xx_1$). On the other hand, unsupervised languages ($zz_1 \ldots zz_{17}$) only have monolingual data. Example methods can make use of parallel data, including but not limited to auxiliary parallel data, to learn the translation task and transfer this task knowledge to one or more of the unsupervised languages.

The parameters of each denoising adapter 220, 222 are trained on a language-specific denoising task using monolingual text for the respective language at 104. FIG. 2 shows an example training method according to training step 104 using the adapters 220, 222 for English ($en^E$, $en^D$). Other parameters of the seq2seq model 200 can be frozen while the parameters of the denoising adapters 220, 222 are trained, up to and including all other parameters.

A denoising function is performed on the monolingual texts, and the denoising adapters 220, 222 learn language-specific encoding and decoding by learning to denoise the monolingual texts, e.g., to reconstruct the original monolingual texts from the noisy texts. The noise function can include, for instance, one or more of token masking, token deletion, word-span masking, sentence permutation, or document rotation. In the example training shown in FIG. 2, a token in an English input sequence of tokens (as shown, including language and end of sentence tags) is masked, and the seq2seq model 200 is trained to predict the original input sequence.

Training step 104 can be performed using only monolingual data for the respective languages for which the denoising adapters 220, 222 are trained; that is, training step 104 can be performed without using parallel language data. This is useful in situations where sufficient parallel data for one or more languages is not available. However, monolingual data can still be used in training step 104 even if other, parallel data is available, and even if such parallel data has been used to pretrain the seq2seq model.

By training parameters of the denoising adapters 220, 222 using the monolingual data in step 104, each of the denoising adapters can be trained to adapt the seq2seq model 200 to a downstream task of multilingual translation including the one or more languages. Because the inserted denoising adapters 220, 222 can be separately trained on language-specific denoising tasks during the step 104, it is not required that the denoising adapters for all of the one or more languages (e.g., French, German, and English in FIG. 2) be concurrently inserted into the seq2seq model 200 for training. For instance, the denoising adapters 220, 222 for each respective language can separately be inserted (step 102) and trained (step 104), and then removed, disconnected, bypassed, etc. so that denoising adapters for other languages can be trained.

To fine-tune the seq2seq model 200, the trained denoising adapters 220, 222 for all of the one or more languages (e.g., French, German, and English in FIG. 2) are inserted or re-inserted at 106 into the encoder and/or decoder, if any of these are not already inserted. For instance, if denoising adapters 220, 222 were separately inserted in step 104 for language-specific training in step 106 and then removed, such denoising adapters can be re-inserted into the seq2seq model 200 so that all denoising adapters are inserted.

Cross-attention weights of the seq2seq model are then fine-tuned at 108 on a translation task on at least one of the one or more languages using parallel data while the trained denoising adapters are inserted.

Figure 5:
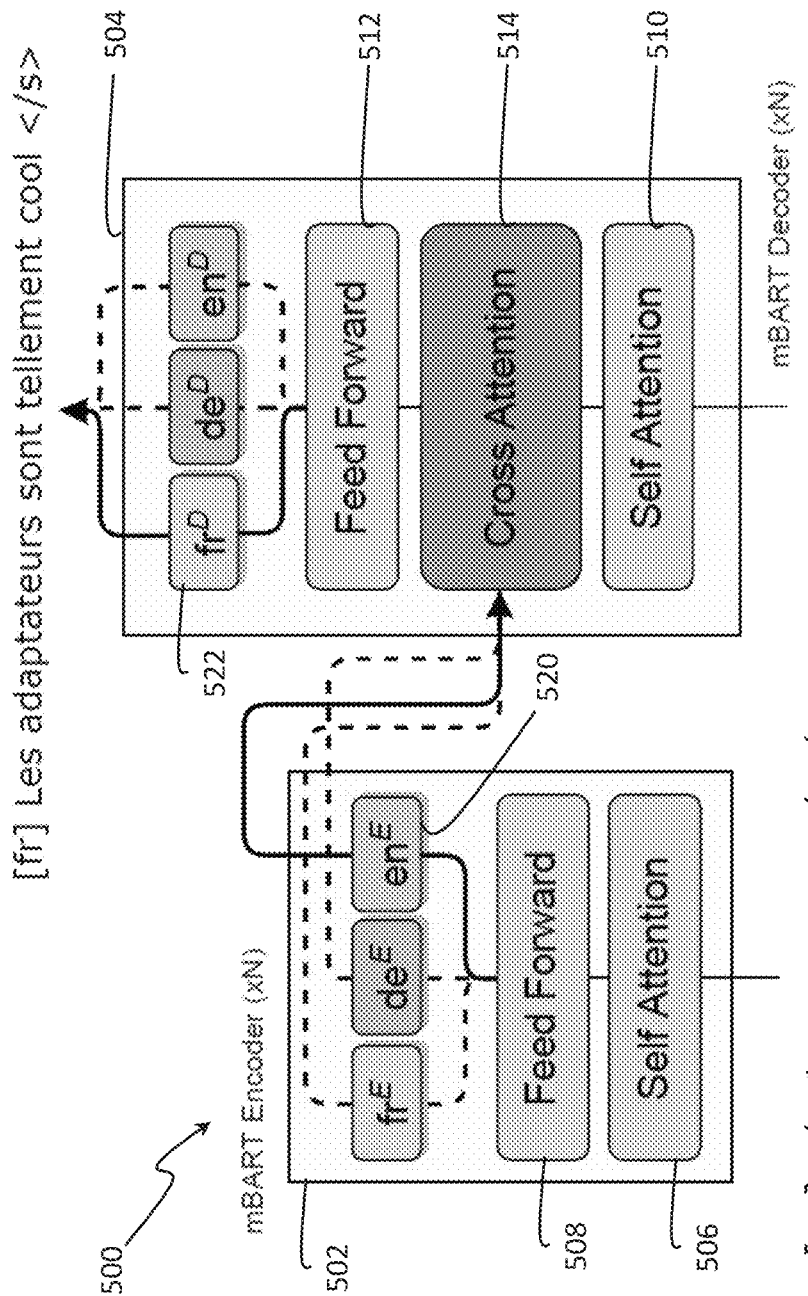
FIG. 5 shows an example operation of a fine-tuning step.

FIG. 5 shows an example operation of fine-tuning step 108. Trained encoder denoising adapters 520, analogous to denoising adapters 220, and trained decoder denoising adapters 522, analogous to denoising adapters 222, for all three languages (French, German, English) are inserted into an encoder 502 and decoder 504 of a seq2seq model 500, analogous to seq2seq model 200.

Further, the output of each of the transformer encoders 302 is fed to the input of the cross-attention layer 514 of the decoder 504. The cross-attention parameters (e.g., weights) in the cross-attention layer 514 are shared among all of the one or more languages (e.g., shared by French, German, and English).

In the fine-tuning step 108, the parameters (e.g., all parameters) of the inserted trained denoising adapters can be frozen, while the parameters (e.g., weights) of the cross-attention layer 514 are updated. Further, parameters (e.g., all parameters, or a subset of the parameters) of the seq2seq model 500 other than those in the cross-attention layer 514 can be frozen during the fine-tuning step 108.

The fine-tuning 108 is performed for the translation task on at least one of the one or more languages using the parallel data. For instance, as shown in FIG. 5, the seq2seq model 500 is trained on an English-French translation task, in which the encoder 502 generates an internal or hidden representation of an input sequence in English and the decoder 504 outputs a prediction of the sequence in French. The English encoder denoising adapter 520 is used in encoding the English input sequence. The French decoder denoising adapter 522 as well as the cross-attention layer 514 shared (in this example) among French, English, and German, are used to predict the French sequence.

The fine-tuned seq2seq model, including the updated parameters for the denoising adapters 520, 522 and the cross-attention layer 514 (and optionally other parameters), can be stored at 110. Storage may be in any format, including non-volatile media.

In the example fine-tuning step 108 shown in FIG. 5, parallel data are used for fine-tuning on an English to French translation task. However, this training also adapts the seq2seq model 500 for multilingual translation, including in German, even if parallel data for German is not used.

Additionally, because parallel data for a particular language is not needed for adapting the seq2seq model to that language, the seq2seq model can be further fine-tuned for multilingual translation including one or more new languages for which the seq2seq model is not pretrained, and for which only monolingual data is available in those languages.

Figure 6:
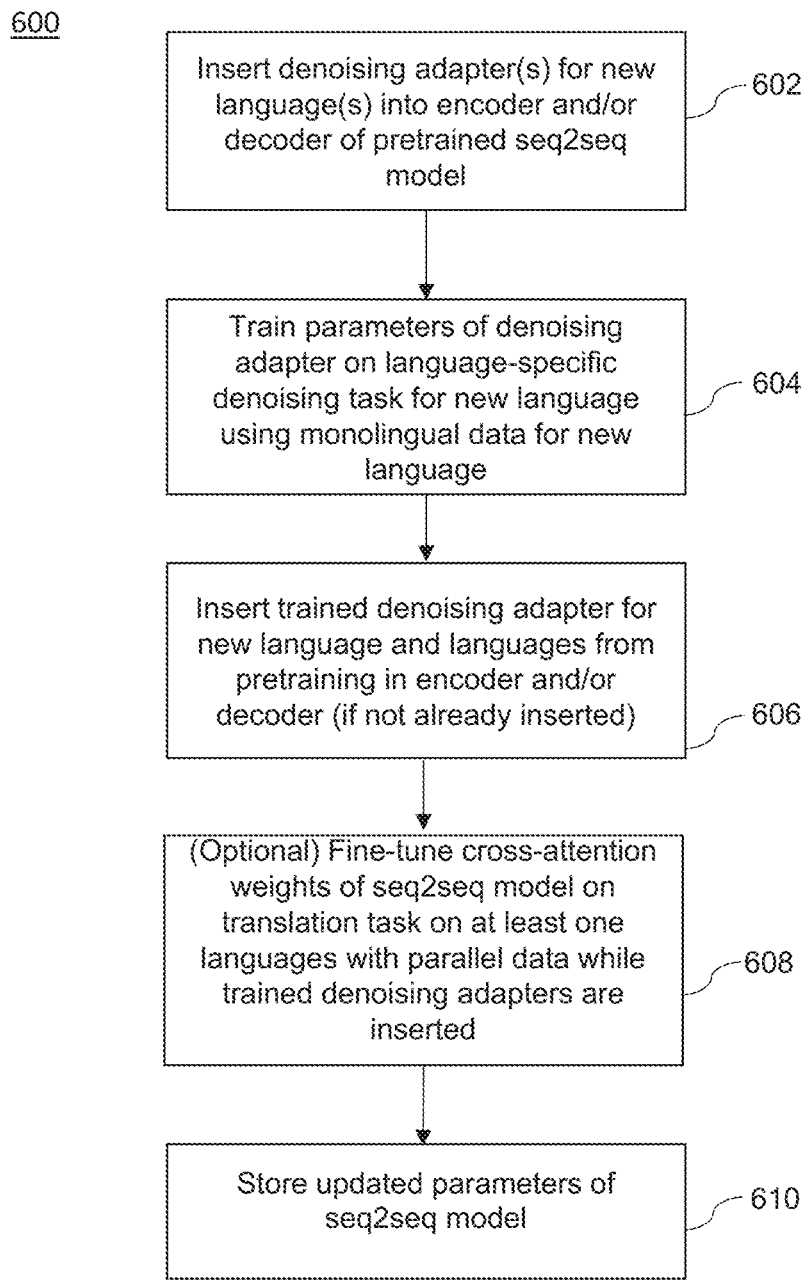
FIG. 6 shows an example method for further fine-tuning of the seq2seq model to incorporate a new language.

FIG. 6 shows an example method 600 for further fine-tuning to incorporate a new language, which can be generally similar to the method 100. For instance, a pretrained seq2seq model may be provided, such as seq2seq model 500 after being fine-tuned for translating in a set of languages (e.g., French, English, German) using the method 100. One or more new denoising adapters for each of one or more new languages (e.g., Nepali) not in the set of languages, analogous to denoising adapters 220, 222 can be inserted at step 602 into an encoder and decoder such as encoder 202 and decoder 204, similar to inserting step 102.

Parameters of the denoising adapters 220, 222 are then trained at 604 on a language-specific task (e.g., a denoising task) using monolingual text for (each) new language. This parameter training can be similar to training step 104, except that, optionally, training parameters (e.g., weights) of a final output projection layer of the seq2seq model can be trained along with the training parameters of each of the one or more new denoising adapters, while the other parameters of the seq2seq model 200 are frozen.

Denoising adapters for the new languages (e.g., Nepali) and for each of the set of languages for which previous adaptive training has taken place (e.g., French, English, German) are inserted at 606 into the encoder and decoder, e.g., encoder 502 and decoder 504 if they were not already inserted, similar to step 106. Optionally, similar to fine-tuning step 108, the cross-attention weights of the seq2seq model may be fine-tuned at 608 on a translation task in one or more languages in the set of languages with parallel data (e.g., French, English, German (if parallel data is available)) while the trained denoising adapters for both the set of languages and the new language (i.e., French, English, German, Nepali) are inserted in the encoder 502 and decoder 504. This step 608 may be omitted, and the denoising adapters after training at 604 may be inserted for unsupervised machine translation with no additional machine translation training. The updated seq2seq model, including updated parameters, can be stored at 610.

The example method 600 can also provide for translating between two unseen languages. For instance, for a language pair including two languages of an unsupervised setup, e.g., Spanish (es) and Dutch (nl), denoising adapters for those languages can be inserted to the seq2seq model, and the model can be directly used without further training for nl→es and es→nl. Such example methods can provide good results, even when language pairs with parallel data are, for instance, English-centric.

Although example methods 100, 600 need not use back-translation for monolingual data, which can be costly and difficult to tune, back-translation for one or more languages may be used in combination with example methods to further fine-tune seq2seq models. Generally, back-translation refers to starting with text in a language L1, translating it to another language L2, and translating this L2 text back to L1. For instance, for each language to be back-translated, a method can include one or more iterations or loops. In each iteration or loop, monolingual sequences in the language can be translated to a second language using the seq2seq model (e.g., a seq2seq model fine-tuned as in example methods, fine-tuned in an earlier iteration, otherwise fine-tuned, pretrained, or not pretrained). The second language is translated back to the respective language using the seq2seq model to generate back-translated data. Parameters of the seq2seq model can be updated using the generated back-translated data, e.g., by training the seq2seq model using the generated back-translated data as parallel data.

Figure 7:
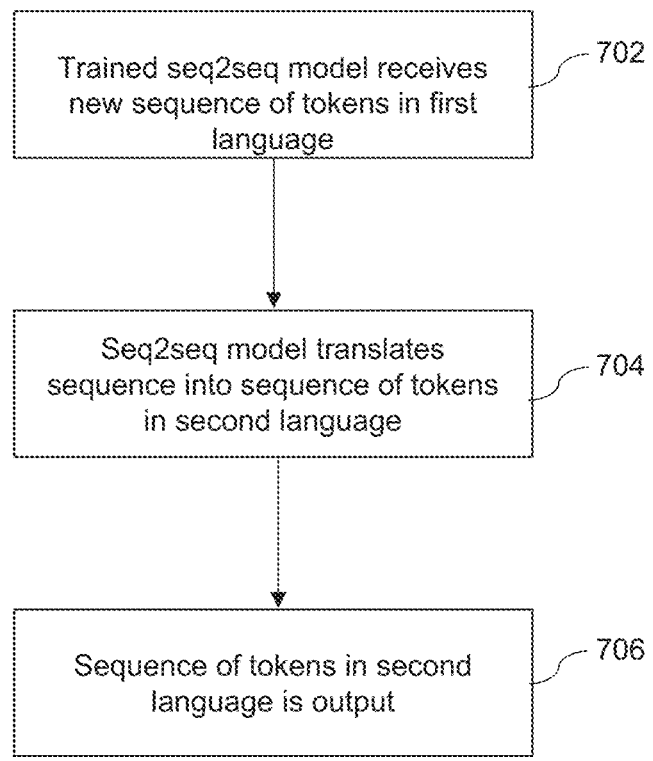
FIG. 7 shows an example method for generating a sequence of tokens in a second language given an input sequence of tokens in a first language.

The seq2seq model fine-tuned using methods 100 or 600 can be used during inference or runtime to translate a new sequence in the one or more languages for which the seq2seq model has been trained, including adaptation via fine-tuning. FIG. 7 shows an example method 700 for generating a sequence of tokens in a second language given an input sequence of tokens in a first language. The trained seq2seq model can include or have access to a vocabulary of tokens in both the first and second languages. However, it is not required that the seq2seq model be trained using parallel data in either the first or the second language.

The trained seq2seq model, e.g., model 500, receives the new sequence of tokens in the first language (the sequence may be tokenized based on the vocabulary in the first language). The seq2seq model 500 processes the input sequence and translates the sequence into a sequence of tokens in the second language at 704. The translation at 704 can be supervised or unsupervised. The sequence of tokens in the second language is output at 706.

Experiments

In experiments, example multilingual UNMT training methods were used to train denoising adapters with monolingual data, and multilingual fine-tuning of cross-attention using auxiliary parallel data was performed to fine-tune an example multilingual UNMT based on a pretrained language model, Multilingual Bidirectional and Auto-Regressive Transformer (multilingual BART or mBART) (Liu et al., Multilingual denoising pre-training for neural machine translation. Transactions of the Association for Computational Linguistics, 8:726-742, 2020). Example methods and systems can add to such a multilingual NMT system by incorporating denoising adapters that, for example, can be exclusively trained on languages zz for which only monolingual data exists.

Because mBART can be seen as a denoising auto-encoder for monolingual texts, an mBART-based multilingual NMT architecture can be augmented by inserting denoising adapter modules that learn to denoise monolingual texts in language zz. In a way, the multilingual NMT system uses the denoising adapters to learn to "translate" from zz to zz. On top of this training of the denoising adapter, the languages for which bilingual data (e.g., with English) exist can be used to fine-tune (exclusively) the cross-attention weights of the overall model. Because these weights are shared between all the languages, they help improve cross-language representation.

Monolingual training of denoising adapters according to example methods herein allows learning of language-specific encoding and decoding through adapter modules that can easily be combined with other languages' adapters for translation. In experiments, training the adapters with a denoising objective transferred mBART to multilingual UNMT by inserting denoising adapters and then fine-tuning cross-attention with auxiliary parallel data. Such example methods were demonstrated to extend mBART with new languages which were not included in pretraining. This allows denoising adapters to be trained incrementally after mBART fine-tuning to add any new language to the existing model.

The experiments demonstrated that example methods provide modularity and flexibility. Models trained using example methods can provide resulting translations that are comparable with back-translating methods as measured, e.g., by BiLingual Evaluation Understudy (BLEU). Additionally, example training methods allow machine translation models to add new (unseen) languages incrementally.

Example Seq2Seq Model: Multilingual BART

Multilingual BART (mBART) is a Transformer model, e.g., as disclosed in Vaswani et al., having 12 encoder and 12 decoder layers with hidden dimension of 1024 and 16 attention heads. mBART has a large multilingual vocabulary of 250k tokens obtained from 100 languages. This model is pretrained by reconstructing, or denoising, the original text from a noisy version corrupted with a set of noising functions. By doing so, it constructs a hidden representation of a sentence in any of these languages, and then these representations share certain properties across languages. This feature has been exploited in the art to provide "multilingual" translation systems by fine-tuning mBART over bilingual data xx→en and en→xx, when such bilingual data exists for a language xx among the original pretraining languages.

To fine-tune mBART to machine translation, the weights of the pretrained model can be loaded, and all parameters can be trained with parallel data either in a bilingual setup (e.g., as disclosed in Liu et al., 2020) or a multilingual setup (e.g., as disclosed e.g., in Stickland et al., Recipes for adapting pre-trained monolingual and multilingual models to machine translation, in Proceedings of the 16th Conference of the European Chapter of the Association for Computational Linguistics: Main Volume, pages 3440-3453, Association for Computational Linguistics, 2021; and Tang et al., Multilingual translation with extensible multilingual pretraining and finetuning. arXiv:2008.00401, 2020) to leverage the full capacity of multilingual pretraining.

Experiments based on example methods herein adapted mBART-50, disclosed in Tang et al. mBART-50 is a seq2seq model pretrained on multilingual texts, which is trained to denoise a given text in any one language belonging to a fixed collection of 50 pretraining languages. mBART-50 is used in example experiments as both the parent model for example denoising adapters and as a strong baseline for multilingual machine translation fine-tuning.

Example Denoising Adapters

For example denoising adapters, a simple feed-forward network was used with a non-linear (e.g., ReLU) activation. Each adapter module further includes a parameterized normalization layer that acts on the input of the adapter and allows learning of the activation pattern of Transformer layers. The architecture of the example adapter layer 300, including ReLu activation layer 314 and normalization layer 310, is shown in FIG. 3.

More formally, a denoising adapter module $D_i$ at layer i includes a layer-normalization (LN) of an input $z_i \in \mathbb{R}^h$, followed by a down-projection $W_{down} \in \mathbb{R}^{h \times b}$ with bottleneck dimension b, a non-linear function (as shown, ReLU), and an up-projection $W_{up} \in \mathbb{R}^{b \times h}$ combined with a residual connection with the input $z_i$:

$$D_i(z_i) = W_{up}^T ReLU(W_{down}^T LN(z_i)) + z_i$$

In the above, bias terms are omitted for clarity. For simplicity, one can denote as $D^E = \{D_{1 \le i \le 12}^E\}$ (resp. $D^D$) the set of encoder (resp. decoder) adapters, e.g., adapters 220, 222.

An adapter module was inserted into each layer of the Transformer encoder and decoder after the feed-forward block, e.g., as in step 102. Encoder and decoder denoising adapters $(D_{xx}^E, D_{xx}^D)$ were trained for each language xx in a language-specific manner, e.g., as in step 104. This allowed combining of encoder adapters $D_{xx}^E$ for source language xx and decoder adapters $D_{yy}^D$ for target language yy to translate from xx to yy.

FIGS. 2 and 5 show example denoising adapters 220, 222, 520, 522. In FIG. 2, the denoising adapters 220, 222 are trained on monolingual data separately for each language, including languages without parallel data. In this step, only adapter layers are trained. In FIG. 5, all denoising adapters 520, 522 that are trained in the prior step (e.g., shown in FIG. 2) are frozen, and only the cross-attention of the seq2seq model is updated with (here, auxiliary) parallel data.

Learning adapters from monolingual data: The denoising adapters were trained on a denoising task as in step 104, which aims to reconstruct text from a version corrupted with a noise function. An example denoising task can be generally similar to mBART pretraining. Formally, an example method trains denoising adapters D to minimize $L_{D_{xx}}$:

$$L_{D_{xx}} = \Sigma_{T \in xx} -\log P(T|g(T); D_{xx})$$

where T is a sentence in language xx and g is the noise function.

Denoising adapters were trained on monolingual data for each language separately, including unsupervised languages (that is, languages without parallel data). This provided a high degree of flexibility for later stages, such as unsupervised machine translation (MT).

During the example monolingual training, as shown in FIG. 2, denoising adapters were inserted into layers of the model, e.g., mBART-based model, but only the denoising adapter parameters are updated. The other parameters of the model remained frozen. For an example noise function g, span masking was used, e.g., as used in mBART pretraining. A span of text with length (e.g., randomly sampled with a Poisson distribution) was replaced with a mask token.

Multilingual MT fine-tuning with auxiliary parallel data: After denoising adapters were trained for each language, the MT model (mBART-based model) in which all adapters are inserted was fine-tuned on the auxiliary multilingual language-centric (e.g., English-centric) parallel data as in fine-tuning step 108, shown by example in FIG. 5. This fine-tuning step is used to force the model to learn how to use and combine denoising adapters for the translation task. During example fine-tuning, only the parameters of the decoder's cross-attention were updated, to limit the computational cost and mitigate catastrophic forgetting. The remaining parameters, including the newly plugged-in adapters, are kept frozen at this stage. When translating from language xx to language yy, only the encoder denoising adapters $D_{xx}^E$ and the decoder denoising adapters $D_{yy}^D$ were activated, as shown in FIG. 5.

Example approaches allow the use of the trained seq2seq model for both supervised translation and unsupervised translation. For example, for an unseen language zz that has no parallel data, new encoder and decoder denoising adapters $\mathbb{D}_{zz}^E$ and $\mathbb{D}_{zz}^D$ can be trained on monolingual data and then combined with other existing languages for source/target side unsupervised translation.

The example denoising adapters allow back-translation to be omitted, and they can provide a high level of modularity and flexibility. No additional joint training is needed beyond the fine-tuning step that uses only languages with parallel data. By using example denoising adapters, a new language that is not included in pretraining (but which may be covered by a tokenizer) can be added successfully to the MT model (e.g., mBART-based model) and used for unsupervised MT.

In experiments using example models and training methods, denoising adapters were trained for 17 diverse unsupervised languages together with 20 auxiliary languages. The final model was evaluated on TED talks (e.g., Qi et al., When and why are pre-trained word embeddings useful for neural machine translation? In Proceedings of the 2018 Conference of the North American Chapter of the Association for Computational Linguistics: Human Language Technologies, Volume 2 (Short Papers), pages 529-535, New Orleans, Louisiana Association for Computational Linguistics, 2018). Results demonstrated that example systems were comparable to systems using back-translation for a majority of languages, while being more modular and efficient. Additionally, using denoising adapters jointly with back-translation was found to further improve unsupervised translation performance.

TED talks were used to create an English-centric (en) multilingual dataset by selecting 20 languages (English as the center language and 19 training languages) with different training sizes ranging from 214k (en↔ar) to 18k (en↔hi) parallel sentences. For multilingual UNMT evaluation, in addition to the 20 training languages, 17 "unsupervised" languages (i.e., without using their parallel data) were selected, 6 of which were unknown to the experimental pretrained language model, mBART.

To train the denoising adapters, Wikipedia and News Crawl (http://data.statmt.org/news-crawl/) were used. For the unsupervised languages, both languages having close relation with the training cluster (e.g., es) and distant languages (e.g., fi) were selected. Different monolingual data sizes were used, ranging from 20M sentences (en) to 900k sentences (ur).

The language list of the example pretrained language model being adapted (mBART-50) was also considered. Among 17 unsupervised languages, 11 were present, and the remaining 6 languages were not included in the pretraining. The mBART vocabulary consisted of 100 languages that covered all of these 17 languages.

Details of the selected languages used in the experiments are shown in Table 1, below. The amount of parallel data for all languages is listed, including those where the parallel data is not used, as it constitutes the training data for the supervised bilingual baselines. The first block of Table 1 shows training languages with parallel data, and the second block refers to unsupervised languages that included in mBART-50. The (selected) parallel data numbers beginning with Spanish and ending with Belarusian indicate data that was only used for the supervised bilingual baselines.

TABLE 1

| Language | Code | Language family | Mono. data (M) | Parallel data (k) |
|---|---|---|---|---|
| English | en | Germanic | 20 | 250 |
| Arabic | ar | Semitic | 20 | 214 |
| Hebrew | he | Semitic | 6.9 | 211 |
| Russian | ru | Slavic | 20 | 208 |
| Korean | ko | Korean | 17 | 205 |
| Italian | it | Romance | 20 | 204 |
| Japanese | ja | Japonese | 20 | 204 |
| Chinese | zh | Sino-Tibetan | 18 | 199 |
| French | fr | Romance | 20 | 196 |
| Portuguese | pt | Romance | 20 | 192 |
| Turkish | tr | Turkic | 19 | 182 |
| Romanian | ro | Romance | 20 | 180 |
| Polish | pl | Slavic | 17 | 176 |
| Vietnamese | vi | Austri-Asiatic | 6.7 | 171 |
| German | de | Germanic | 20 | 167 |
| Persian | fa | Iranian | 5.7 | 150 |
| Czech | cs | Slavic | 20 | 103 |
| Thai | th | Tai-Kadai | 2.2 | 98 |
| Burmese | my | Sino-Tibetan | 0.2 | 21 |
| Hindi | hi | Indic | 20 | 18 |
| Spanish | es | Romance | 5 | 196 |
| Dutch | nl | Germanic | 5 | 183 |
| Crotian | hr | Slavic | 5 | 122 |
| Ukrainian | uk | Slavic | 5 | 108 |
| Indonesian | id | Austronesian | 4.8 | 87 |
| Swedish | sv | Germanic | 5 | 56 |
| Lithuanian | lt | Slavic | 4.5 | 41 |
| Finnish | fi | Finnic | 5 | 24 |
| Estonian | et | Finnic | 5 | 10 |
| Urdu | ur | Indic | 0.9 | 5.9 |
| Kazakh | kk | Turkic | 3.4 | 3.3 |
| Bulgarian | hg | Slavic | 20 | 174 |
| Hungarian | hu | Uralic | 20 | 147 |
| Serbian | sr | Slavic | 8.7 | 136 |
| Greek | el | Greek | 11 | 134 |
| Danish | da | Germanic | 2.9 | 44 |
| Belarusian | be | Slavic | 1.7 | 4.5 |

Example Methods were Compared to the Following Baselines

1) BILINGUAL: Baseline bilingual models trained on TED talks. These are small Transformer models trained separately on each language direction, using the settings disclosed in Philip et al., Monolingual adapters for zero-shot neural machine translation, In Proceedings of the 2020 Conference on Empirical Methods in Natural Language Processing (EMNLP), pages 4465-4470, Online. Association for Computational Linguistics, 2020. These models do not have any pretraining and are trained from scratch.

2) MBART-FT: Standard fine-tuning of mBART, as disclosed in Liu et al., Multilingual denoising pre-training for neural machine translation, Transactions of the Association for Computational Linguistics, 8:726-742, 2020, on the multilingual MT task.

3) TASK ADAPTERS: Multilingual fine-tuning for language-agnostic MT adapters and cross-attention on top of mBART, similar to that disclosed in Stickland et al., Recipes for adapting pre-trained monolingual and multilingual models to machine translation, in Proceedings of the 16th Conference of the European Chapter of the Association for Computational Linguistics: Main Volume, pages 3440-3453, Association for Computational Linguistics, 2021.

The bilingual models, and all of the mBART variants, were fine-tuned on the same English-centric multilingual parallel data.

Multilingual MT training: mBART-based models were trained by using a maximum batch size of 4k tokens and accumulated gradients over 5 update steps with mixed precision (e.g., as disclosed in Ott et al. Scaling neural machine translation, In Proceedings of the Third Conference on Machine Translation: Research Papers, pages 1-9, Brussels, Belgium. Association for Computational Linguistics, 2018) for 120k update steps. ADAM optimization (e.g., as disclosed in Kingma and Ba, Adam: A method for stochastic optimization. Proceedings of ICLR, 2014) was applied with a polynomial learning rate decay and a linear warmup of 4,000 steps for a maximum learning rate of 0.0001. Additionally, dropout was used with a rate of 0.3, and label smoothing was used with a rate of 0.2.

For efficient training, the unused tokens from the mBART vocabulary were filtered out after tokenization of the training corpora (including both TED talks and monolingual datasets), which resulted in a shared vocabulary of 201k tokens. Additionally, following the method disclosed in Arivazhagan et al., Massively multilingual neural machine translation in the wild: Findings and challenges, CoRR, abs/1907.05019, 2019, temperature-based sampling was used with T=5 to balance language pairs during training.

For bilingual baselines, the models were trained for 25k updates on the TED talks bilingual data, with maximum 4k tokens per batch and accumulated gradients over 4 updates. Joint byte pair encoding (BPE) models of size 8k were used for these models. All experiments were performed using the fairseq library, as disclosed in Ott et al., fairseq: A fast, extensible toolkit for sequence modeling. In Proceedings of the 2019 Conference of the North American Chapter of the Association for Computational Linguistics (Demonstrations), pages 48-53, Minneapolis, Minnesota, Association for Computational Linguistics, 2019.

Adapter modules: The example adapters for all experiments used the architecture disclosed in Philip et al., 2020 with a bottleneck dimension of 1024. For the example noising function for the denoising adapters, 30% of the words in each sentence were masked with a span length that was randomly sampled by a Poisson distribution ($\lambda$=3.5), as with mBART in Liu et al., 2020. These adapters were trained separately for each language for 100k training steps by using a maximum batch size of 4k tokens, accumulating gradients over 8 update steps and a maximum learning rate of 0.0002. Other hyperparameters were the same as in the NMT training.

Back-translation: For another part of the comparative evaluation, offline back-translation was used for 1) comparing an example method provided herein, labeled DENOISING ADAPTERS, with baselines that were additionally trained on back-translated synthetic parallel data; and 2) measuring the impact of back-translation when it was applied in conjunction with denoising adapters.

Following methods disclosed in Garcia et al., Harnessing multilinguality in unsupervised machine translation for rare languages, in Proceedings of the 2021 Conference of the North American Chapter of the Association for Computational Linguistics: Human Language Technologies, pages 1126-1137, Association for Computational Linguistics, 2021, the monolingual data was back-translated into English (en) for each unsupervised language zz with the respective model. Following that, the corresponding model was fine-tuned by using its back-translated parallel data in a single (bilingual) direction for both zz→en and en→zz separately.

For fine-tuning, either the full model was fine-tuned (MBART-FT) or only the adapters' and cross-attention's parameters were updated (TASK ADAPTERS, DENOISING ADAPTERS) for 120k additional steps. For comparison, the monolingual data was limited to 5M for both denoising adapter training and back-translation in the experiments. This procedure is both memory and time-intensive, as it requires back-translating a large amount of monolingual data, and it also results in an extra bilingual model to be trained for each unsupervised language and for all models that were evaluated.

The fairseq library (Ott et al., 2019) was used to conduct the experiments. The hyperparameters used for fairseq are shown in Table 2, below. The first block gives the base settings used for MBART-FT, and the second block gives the details for the example method (DENOISING ADAPTER) when it differs from these settings. For the parallel data, the TED talks corpus was used without any other pre-processing than the mBART SentencePiece tokenization. For the monolingual data, the Wikipedia articles were downloaded together with NewsCrawl datasets for each language.

For Wikipedia articles, the data was preprocessed by using WikiExtractor (Attardi, Wikiextractor. https://github.com/attardi/wikiextractor, 2015) and tokenized sentences. Denoising adapters were trained and mBART models were fine-tuned using 4 Tesla V100 GPUs with mixed precision. For evaluation over the TED talks test sets, SacreBLEU (Post, A call for clarity in reporting BLEU scores. In Proceedings of the Third Conference on Machine Translation: Research Papers, pages 186-191, Belgium, Brussels. Association for Computational Linguistics 2018) was used. The best checkpoint was chosen according to validation BLEU scores for NMT models, while for example denoising adapters the last checkpoint was used for each language.

TABLE 2

| Hyper-Parameter | Value |
| --- | --- |
| Architecture | mbart_large |
| Optimizer | Adam |
| $\beta_1, \beta_2$ | 0.9, 0.98 |
| Weight decay | 0.01 |
| Label smoothing | 0.2 |
| Dropout | 0.3 |
| Attention dropout | 0.1 |
| Batch size | 4k (tokens) |

TABLE 2-continued

| Hyper-Parameter | Value |
| --- | --- |
| Update frequency | 5 |
| Warmup updates | 4000 |
| Total number of updates | 120k |
| Max learning rate | 0.0001 |
| Learning rate scheduler | polynomial_decay |
| Temperature (sampling) | 5 |
| Adapter dim. | 1024 |
| Noise function | span_masking |
| Mask ratio | 0.3 |
| Mask random replace ratio | 0.1 |
| Poisson lambda | 3.5 |
| Update frequency | 8 |
| Total number of updates | 100k |
| Max learning rate | 0.0002 |

Results

FIG. 8 shows translation results for 11 languages that have no parallel data, in both zz→en and en→zz directions. The first two blocks in each direction, 1) and 2), show unsupervised translation results without using back-translation. For zz→en, the two baselines MBART-FT and TASK ADAPTERS had good results. For instance, the ability of mBART to encode the unsupervised source languages and its transfer to NMT using auxiliary parallel data provided good multilingual unsupervised NMT performance. Among the two baselines, task-specific MT adapters better mitigated catastrophic forgetting, ensuring the model did not overfit to the supervised languages and benefitted more from multilingual fine-tuning, which resulted in a +5.4 BLEU compared to standard fine-tuning.

Present example methods, however, outperformed the two mBART baselines and the bilingual models. Denoising adapters were superior for all languages compared to MBART-GT and TASK ADAPTERS and resulted in +8.6 and +3.2 BLEU on average, respectively. Example methods also performed better than the supervised bilingual models for most languages (all but es and nl).

For the en→zz direction, the two baselines MBART-FT and TASK ADAPTERS were ineffective, showing limitations of mBART pretraining for multilingual UNMT when translating from (as opposed to translating to) English. One possible explanation for this is that these models had learned to encode English with only auxiliary target languages, and the transfer from mBART to NMT made the decoder forget how to generate text in the 11 unsupervised languages of interest.

Figure 9:
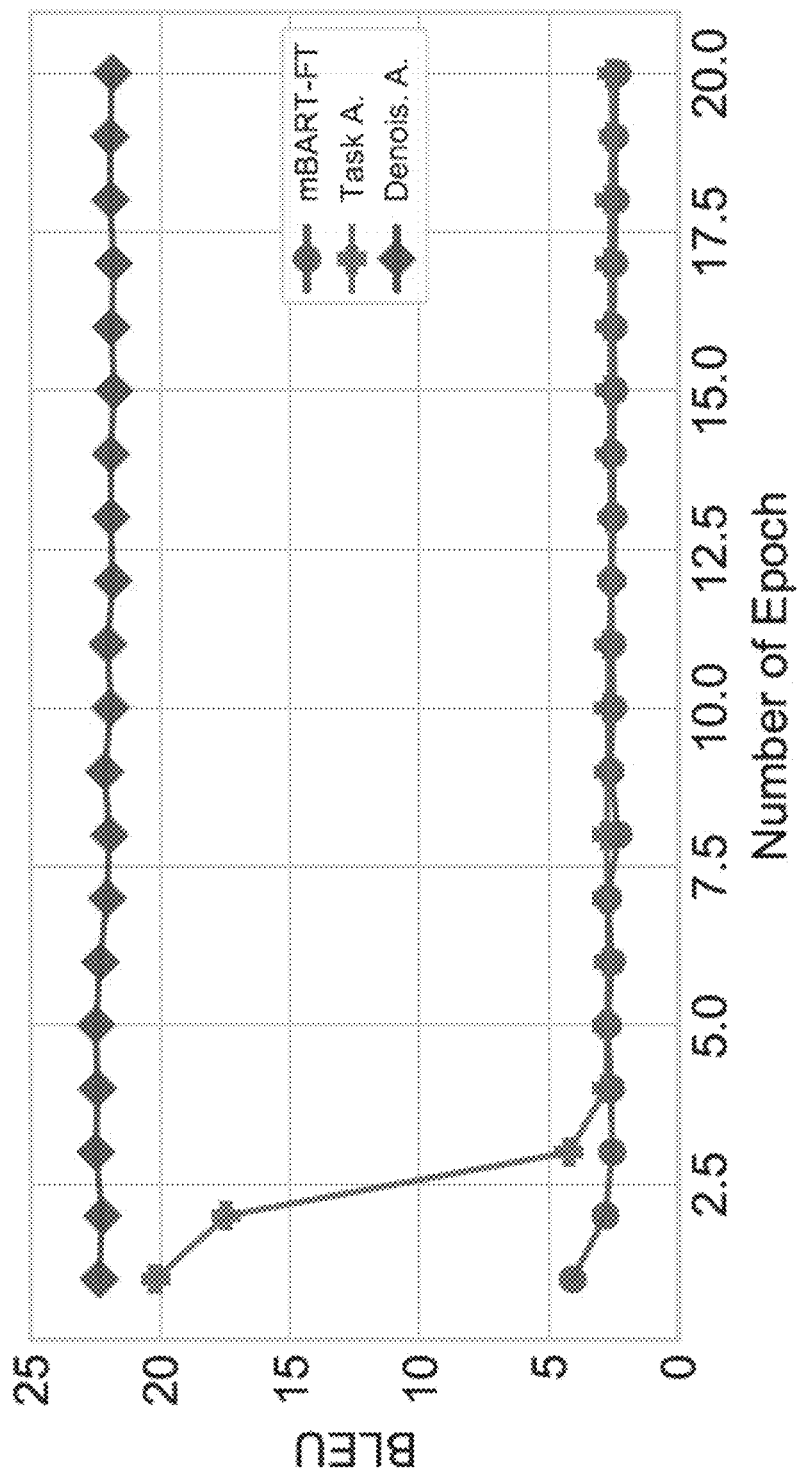
FIG. 9 shows en→nl (unsupervised) experimental performance on validation data during multilingual Bidirectional and Auto-Regressive Transformer (mBART) fine-tuning for experimental models.

FIG. 9 shows unsupervised translation performances for en→nl in the validation set during mBART fine-tuning. As opposed to the results of the present example methods, the low start in MBART-FT and the quick drop in TASK ADAPTERS confirm the forgetting in generation. However, denoising adapters that leverage monolingual training for language-specific representations enable the final experimental model to achieve high translation quality without any parallel data even without back-translation. Denoising adapters also outperformed the supervised bilingual models trained with less than 50k parallel sentences.

Impact of back-translation: The $3^{rd}$ blocks (3) in FIG. 8 show the unsupervised translation results after models were fine-tuned with offline back-translated parallel data. In this step each model was fine-tuned for a single language-pair and only one direction.

For zz→en, although back-translation slightly improved the results, the overall impact of back-translation was very limited for all models (for ur, the back-translation decreased the performance). This is believed to have been related to the domain difference between test (TED talks) and back-translation data (Wikipedia/News). Here, denoising adapters without back-translation still provided superior unsupervised translation quality compared to baselines even after the back-translation.

For en→zz, the back-translation significantly improved translation results, as demonstrated by +15.0, +16.2, and +3.0 BLEU for MBART-FT, TASK ADAPTERS, AND DENOISING ADAPTERS, respectively. It is believed that the large boost in the baselines' scores was due to the fact that training on the back-translated parallel data allowed those models to recover generation ability in the target languages. However, the approach provided by the present example models outperformed baselines in all languages, showing that denoising adapters can be used jointly with back-translation for further improvements. Denoising adapters without back-translation (2) were still competitive with the mBART baselines.

Denoising adapters for languages unknown to mBART: All the languages considered in the results discussed above and shown in FIG. 8 were included in the mBART-50 pretraining data. In additional experiments, the example model was evaluated on languages that were new to mBART-50 to test whether example denoising adapters can be used to extend the translation model incrementally to new languages using monolingual data.

After training the example denoising adapters, they were inserted into the existing NMT model disclosed above for unsupervised MT with no additional NMT training. Denoising adapter layers were trained the same way as before, except that the output projection layer of mBART was updated together with the adapter layers to improve language-specific decoding.

FIG. 10 shows the results in both directions for the bilingual baselines and other mBART variants that were fine-tuned with only auxiliary parallel data. For zz→en, although the models were trained on English-centric multilingual parallel corpora with related languages, mBART baselines still had very poor unsupervised MT performance.

Denoising adapters, however, with the advantage of monolingual data and modular training, displayed competitive or better results even compared to supervised bilingual baselines. Further, for the en→zz direction, denoising adapters provided a reasonable level of unsupervised translation quality that could be used with back-translation for further improvements. Since neither mBART pretraining nor the multilingual fine-tuning included the new languages, the other baselines were not able to translate in these directions.

FIG. 11 shows supervised translation results to and from English for auxiliary languages (12 representative languages are shown). Languages are presented by decreasing amount of parallel data used for training the bilingual baselines. The results confirmed that example methods and models using denoising adapters provided efficient ways to extend mBART to new languages. Additionally, taken together with other results, the unsupervised translation quality for missing languages without additional NMT further demonstrated the effectiveness of example methods and systems.

Figure 12:
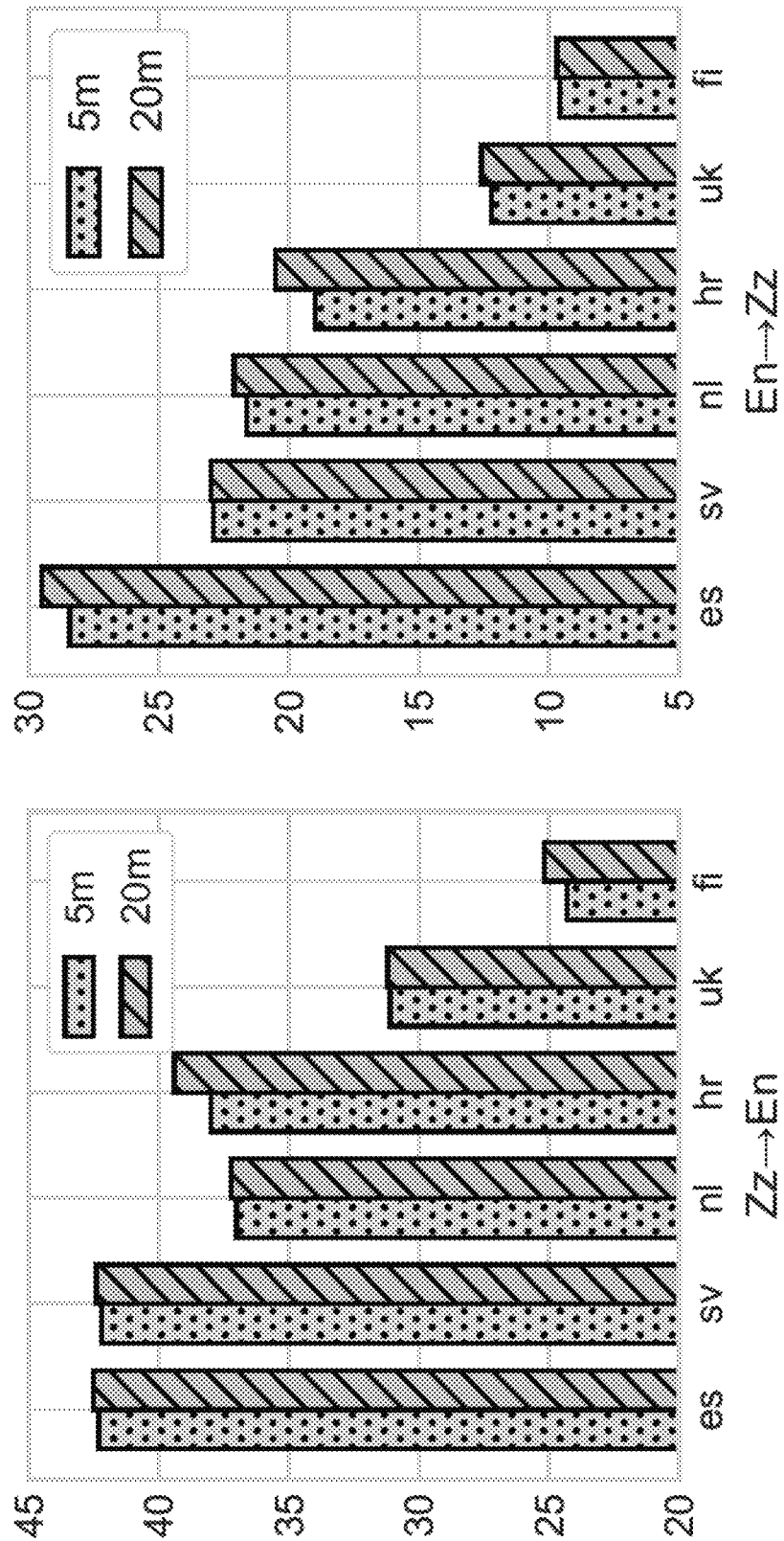
FIG. 12 shows experimental unsupervised training results (BLEU) for example denoising adapters trained on 5 m and 20 m sentences.

Monolingual data size: To assess the impact of the monolingual data size that is used for training of denoising adapters, adapters were further trained on larger data for 6 languages (es, sv, nl, hr, uk, fi). FIG. 12 shows the unsupervised translation results when the adapters were trained on two different data sizes: 5 m and 20 m sentences. For a majority of languages, the performance improvement was quite limited with the increase in data size. This confirmed that denoising adapters achieved competitive performance without the need for a large amount of monolingual data.

Supervised translation: The baselines and the example model were evaluated on the supervised languages (i.e., the auxiliary languages with access to parallel data). FIG. 11 shows BLEU scores for xx→en and en→xx directions. In this experimental setting, in addition to the main baselines, LANGUAGE ADAPTERS (Philip et al., 2020) were used, which corresponds to fine-tuning both language-specific MT adapters and cross-attention on top of mBART only with parallel data.

As expected, for both directions, multilingual fine tuning of mBART (MBART-FT) performed the best on average. The performance of LANGUAGE ADAPTERS was on par with full fine-tuning. For xx→en, it outperformed full fine-tuning in 10 out of 20 language pairs, with a very similar overall score. For en→xx, it only had a −0.5 BLEU on average. TASK ADAPTERS had slightly lower translation performance than the other two models on both directions. Nonetheless, on en→xx direction, as the amount of parallel data decreased, the gap between this model and full MBART-FT reduced, confirming that task adapters are beneficial for small data and distant language pair conditions.

As for multilingual fine-tuning with DENOISING ADAPTERS, although it had lower scores than other mBART variants, it still performed competitively with the bilingual baselines. It outperformed the bilingual baselines in xx→en and received −0.7 BLEU on average in en→xx. Unlike other mBART variants, fine-tuning only the decoder's cross-attention seemed to penalize performance. These results demonstrated that example methods can still perform competitively for large-scale supervised multilingual NMT arrangements.

Comparison with other methods: To provide a comparison with a previously disclosed setup that does not include back-translation, another experiment replicated the language-transfer results reported in Liu et al., 2020 for mBART. mBART-50 was fine-tuned (as disclosed in Tang et al., 2020) on Hindi-English (hi→en) parallel data from IITB (Kunchukuttan et al., The IIT Bombay English-Hindi parallel corpus. CoRR, abs/1710.02855, 2017) and the resulting model was tested on two unseen languages, Nepali (ne) and Sinhalese (si), from the FLoRes dataset (Guzman et al., The flores evaluation datasets for low-resource machine translation: Nepali—english and sinhala—English, In Proceedings of the 2019 Conference on Empirical Methods in Natural Language Processing and the 9th International Joint Conference on Natural Language Processing (EMNLP-IJCNLP), pages 6100-6113, 2019) without any further training on back-translated data. For DENOISING ADAPTERS, adapters were trained on monolingual data provided by FLoRes for all four languages (en, hi, ne, si). For MT transfer, these language-specific adapters were inserted into mBART, and the cross-attention layers were updated as in the experiments described above. Results are shown in FIG. 13.

Results were compared in terms of BLEU, chrF (Popovic, chrF: character n-gram F-score for automatic MT evaluation. In Proceedings of the Tenth Workshop on Statistical Machine Translation, pages 392-395, Lisbon, Portugal. Association for Computational Linguistics, 2015), COMET (Rei et al, COMET: A neural framework for MT evaluation. In Proceedings of the 2020 Conference on Empirical Methods in Natural Language Processing (EMNLP), pages 2685-2702, Online. Association for Computational Linguistics, 2020) and BERT score (Zhang et al., Bertscore: Evaluating text generation with bert, In International Conference on Learning Representations, 2020). In all three metrics the example DENOISING ADAPTERS model significantly outperformed MBART-FT, demonstrating the effectiveness of example denoising adapters for low resource languages, compared to a strong baseline.

Denoising Adapters for Domain Adaptation

Figure 14:
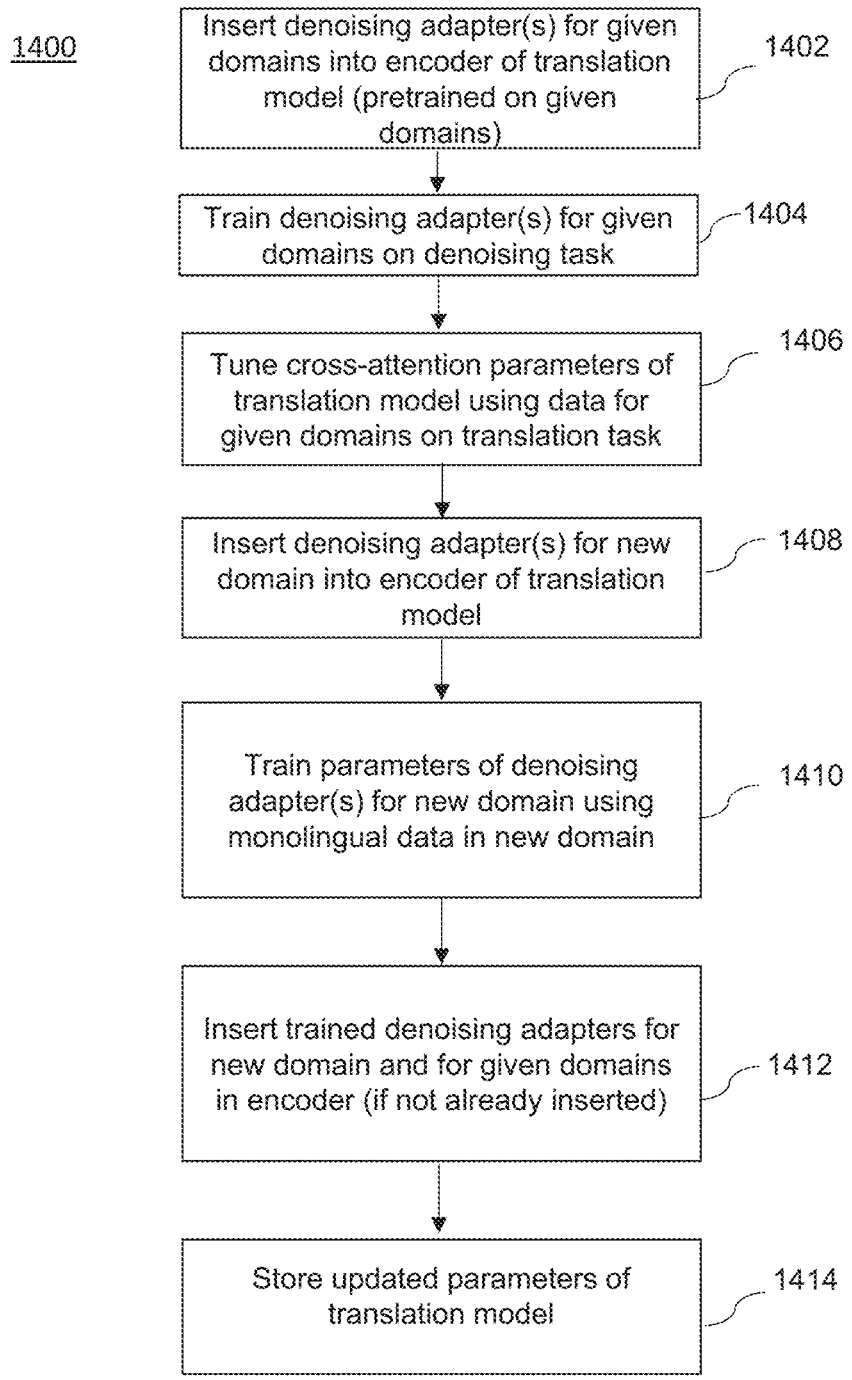
FIG. 14 shows an example unsupervised training method for adapting a multidomain translation model to a new domain.

Other example methods can apply example denoising adapters to domain adaptation. Such methods are useful, for instance, in cases where back-translation is otherwise a standard solution to leverage monolingual data, or in other cases. FIG. 14 shows an example unsupervised training method 1400 for adapting a multidomain translation model to a new domain T. The multilingual translation model can be pretrained, e.g., for translating between a sequence in a source language xx and a target language yy in each of one or more given domains $D_1, \ldots, D_n$. The new domain T, for instance, can have associated monolingual data $T_{xx}$ in xx.

One or more denoising adapter layers are inserted at 1402 for each given domain $D_1, \ldots, D_n$ into an encoder of the multilingual translation model, such as the encoder 202. The denoising adapters for the given domains are trained at 1404 on a denoising task, e.g., using data for the respective given domains 1 . . . n. For instance, parameters of each of the one or more denoising adapters can be trained on a domain-specific denoising task using monolingual text for each of the $D_1 \ldots D_n$ given domains. The data for the given domains $D_1 \ldots D_n$ and for the new domain T can be tagged for each respective domain. Training of individual denoising adapter layers can be performed individually on domain-specific tasks (e.g., the relevant denoising adapter layer can be inserted corresponding to each domain), similar to the training of denoising adapters for individual languages in method 100. Other parameters of the multilingual translation model may be frozen. Cross-attention parameters of the multilingual translation model are tuned at 1406 on a translation task using data for the given domains $D_1, \ldots, D_n$, while the (trained) denoising adapter layers for each given domain $D_1, \ldots, D_n$ are inserted into the encoder.

One or more new denoising adapter layers $D_T$ for the new domain T are inserted at 1408 into the encoder of the multilingual translation model (such as the encoder 202). Parameters of the new denoising adapter layers $D_T$ are trained at 1410 for the new domain T on a denoising task using monolingual data $T_{xx}$ in the new domain T. Other parameters of the multilingual translation model may be frozen.

The (trained) new denoising adapter layer $D_T$ and the (trained) denoising adapter layers for the given domains $D_1, \ldots, D_n$ are inserted into the encoder of the multilingual translation model at 1412, if they are not already inserted. The updated parameters of the multilingual translation model can be stored at 1414.

System Architecture

Figure 15:
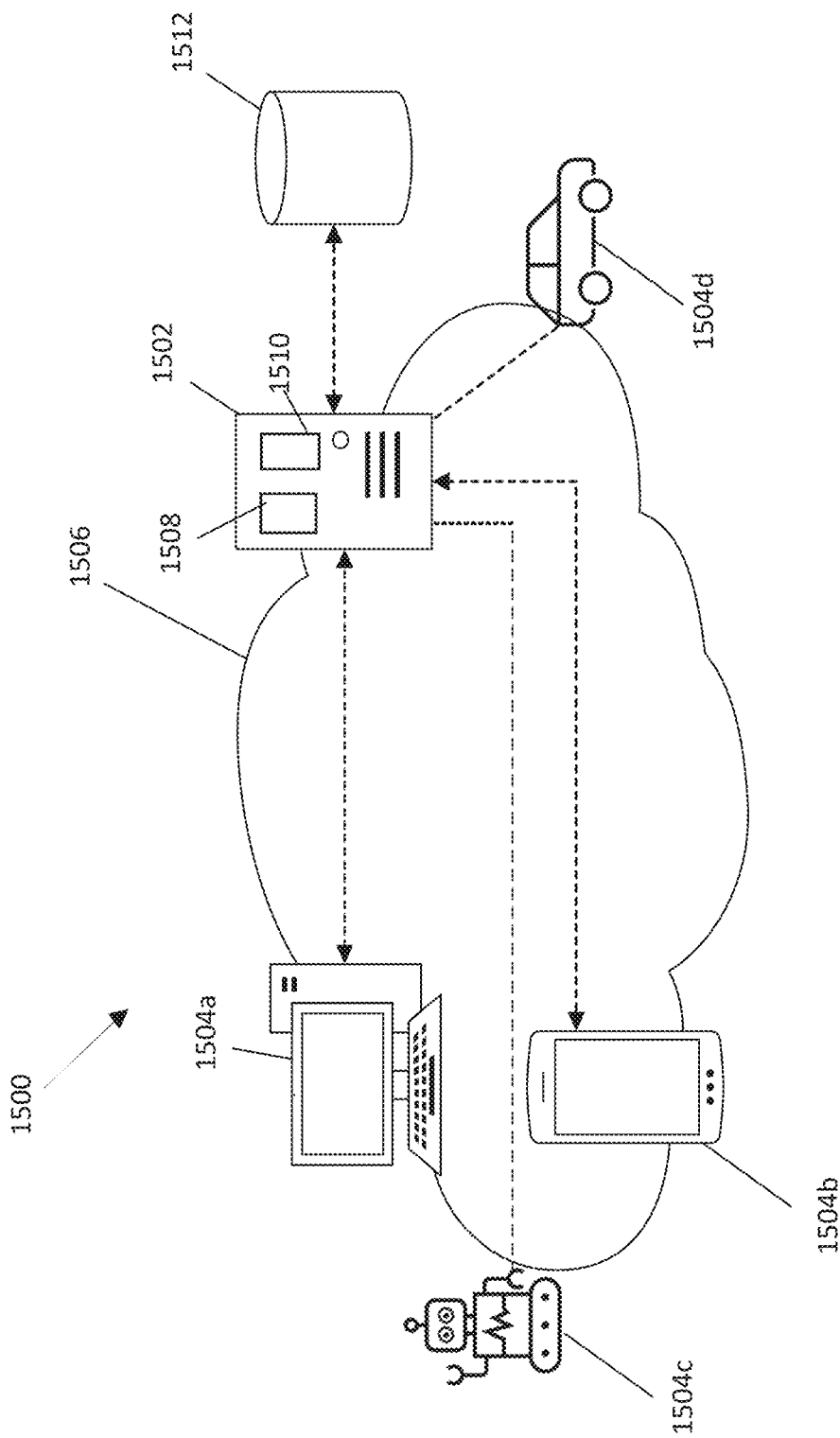
FIG. 15 shows an example architecture that may be used for implementing example methods.

Example systems, methods, and embodiments may be implemented within a system or network architecture 1500 such as the architecture illustrated in FIG. 15, which includes a server 1502 and one or more client devices 1504 that communicate over a network 1506 which may be wireless and/or wired, such as the Internet, for data exchange. The server 1502 and the client devices 1504 can each include a processor, e.g., processor 1508 and a memory, e.g., memory 1510 (shown by example in server 1502), such as but not limited to random-access memory (RAM), read-only memory (ROM), hard disks, solid state disks, or other non-volatile storage media. Memory 1510 may also be provided in whole or in part by external storage in communication with the processor 1508.

The seq2seq model 200, 500 for instance, may be embodied in the processor 1508 or other processor in the server 1502 and/or client devices 1504. It will be appreciated that the processor 1508 can include either a single processor or multiple processors operating in series or in parallel, and that the memory 1510 can include one or more memories, including combinations of memory types and/or locations. Server 1502 may also include, but are not limited to, dedicated servers, cloud-based servers, or a combination (e.g., shared). Storage, e.g., a database, may be embodied in suitable storage in the server 1502, client device 1504, a connected remote storage 1512 (shown in connection with the server 1502, but can likewise be connected to client devices), or any combination.

Client devices 1504 may be any processor-based device, terminal, etc., and/or may be embodied in a client application executable by a processor-based device, etc. Client devices may be disposed within the server 1502 and/or external to the server (local or remote, or any combination) and in communication with the server. Example client devices 1504 include, but are not limited to, autonomous computers 1504a, mobile communication devices (e.g., smartphones, tablet computers, etc.) 1504b, robot 1504c, autonomous vehicle 1504d, wearable devices, virtual reality, augmented reality, or mixed reality devices (not shown), or others. Client devices 1504 may be configured for sending data to and/or receiving data from the server 1502, and may include, but need not include, one or more output devices, such as but not limited to displays, printers, etc. for displaying or printing results of certain methods that are provided for display by the server. Client devices may include combinations of client devices.

In an example training method, the server 1502 or client devices 1504 may receive a dataset from any suitable source, e.g., from memory (as nonlimiting examples, internal storage, an internal database, etc.), from external (e.g., remote) storage 1512 connected locally or over the network 1506. The example training method can generate a trained seq2seq model (including updated model parameters) that can be likewise stored in the server (e.g., memory 1510), client devices 1504, external storage 1512, or combination. In some example embodiments provided herein, training and/or inference may be performed offline or online (e.g., at run time), in any combination. Results can be output (e.g., displayed, transmitted, provided for display, printed, etc.) and/or stored for retrieving and providing on request.

In an example training method, the server 1502 or client devices 1504 may receive a dataset including monolingual and/or parallel text in one or more languages and/or domains from any suitable source, e.g., by local or remote input from a suitable interface, or from another of the server or client devices connected locally or over the network 1506. Trained models (including updated model parameters) such as the example neural seq2seq model can be likewise stored in the server (e.g., memory), client devices 1504, external storage 1512, or combination. In some example embodiments provided herein, training and/or inference may be performed offline or online (e.g., at run time), in any combination.

In an example multilingual machine translation method during inference or runtime the server 1502 or client devices 1504 may receive an input sequence in a first language from any suitable source, e.g., by local or remote input from a suitable interface (e.g., keyboard, mouse, stylus, touch pad, touch screen, microphone with speech-to-text processing, etc.), or from another of the server or client devices connected locally or over the network 1506 and process the input sequence using the example seq2seq model to provide an output sequence in a second language. Results of processing by the seq2seq model can be output, e.g., spoken, transmitted, displayed, provided for display, printed, and/or stored for retrieving and providing on request.

Generally, embodiments can be implemented as computer program products with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor.

Embodiments described herein may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

General

Embodiments of the present invention provide, among other things, an (e.g., unsupervised) training method for a neural multilingual sequence-to-sequence (seq2seq) model, the method comprising: inserting, in a memory accessed by one or more processors, one or more denoising adapters for each of one or more languages into an encoder and/or a decoder of the seq2seq model; training, by one or more processors, parameters of each of the one or more denoising adapters on a language-specific denoising task using monolingual text for each of the one or more languages; and fine-tuning, by one or more processors, cross-attention weights of the seq2seq model with the denoising adapters and the trained parameters on a translation task in at least one of the one or more languages with parallel data. In addition to any of the above features in this paragraph, the seq2seq model may comprise a machine translation model. In addition to any of the above features in this paragraph, the seq2seq model may be a transformer-based model. In addition to any of the above features in this paragraph, the seq2seq model may comprise a multilingual auto-regressive transformer. In addition to any of the above features in this paragraph, the seq2seq model may comprise a transformer encoder and a transformer decoder, the transformer decoder may comprise a cross-attention layer, and said fine-tuning may comprise fine-tuning cross-attention weights of the cross-attention layer. In addition to any of the above features in this paragraph, the transformer encoder layer may comprise a feedforward encoder layer and a self-attention layer having a plurality of attention heads; and the transformer decoder may comprise a feedforward decoder layer, a self-attention layer having a plurality of attention heads, and the cross-attention layer. In addition to any of the above features in this paragraph, the transformer encoder may be configured to generate a hidden representation of an input sequence in a first language, and the transformer decoder may be configured to generate an output sequence in a second language. In addition to any of the above features in this paragraph, each of the denoising adapters may be trained to adapt the seq2seq model to a task of multilingual translation including the one or more languages. In addition to any of the above features in this paragraph, each of the denoising adapters may comprise lightweight residual layers. In addition to any of the above features in this paragraph, each of the denoising adapters may comprise a normalization layer, a down projection layer, a non-linear activation function, an up-projection layer, and a residual connection combining an output of the up-projection layer with an input to the adapter. In addition to any of the above features in this paragraph, the seq2seq model may be pre-trained for translating from a sequence in a source language to a sequence in a target language, and the source and target languages may be taken from a set of languages. In addition to any of the above features in this paragraph, the seq2seq model may have a vocabulary of tokens in each of the set of languages. In addition to any of the above features in this paragraph, for at least one language in the set of languages, training the seq2seq model may use only monolingual data for the language when training the seq2seq model for translating to or from a sequence in that language. In addition to any of the above features in this paragraph, said inserting the one or more denoising adapters may comprise inserting one or more denoising adapters for each of the one or more languages into each of the encoder and the decoder of the seq2seq model. In addition to any of the above features in this paragraph, the encoder may comprise a transformer encoder and the decoder may comprise a transformer decoder, the transformer decoder may comprise a cross-attention layer, said fine-tuning cross-attention weights may learn the cross-attention layer, the transformer encoder layer may comprise a feedforward encoder layer and a self-attention layer having a plurality of attention heads, and the transformer decoder may comprise a feedforward decoder layer, a self-attention layer having a plurality of attention heads, and the cross-attention layer; and said inserting the one or more denoising adapters may comprise inserting one or more denoising adapter layers for each of the one or more languages into each of the transformer encoder and the transformer decoder following self-attention and feedforward layers; and the output of the transformer encoder may be fed to the cross-attention layer of the transformer decoder. In addition to any of the above features in this paragraph, said training parameters of the one or more denoising adapters for each language may use only monolingual texts for each of the one or more languages. In addition to any of the above features in this paragraph, the denoising adapters may learn language-specific encoding and decoding in each of the one or more languages by denoising the monolingual texts in each respective language. In addition to any of the above features in this paragraph, the denoising may comprise performing a noise function on the monolingual text, and the noise function may comprise one or more of: token masking, token deletion, word-span masking, sentence permutation, or document rotation. In addition to any of the above features in this paragraph, said training parameters of each of the one or more denoising adapters may be performed while freezing other parameters of the seq2seq model. In addition to any of the above features in this paragraph, said training parameters of each of the one or more denoising adapters may be performed while freezing all parameters of the seq2seq model other than the parameters of the one or more denoising adapters. In addition to any of the above features in this paragraph, said training parameters of each of the one or more denoising adapters may be performed while freezing all parameters of the seq2seq model other than the parameters of the one or more denoising adapters and weights of an output projection layer in the seq2seq model. In addition to any of the above features in this paragraph, the seq2seq model may be pretrained for translating from a sequence in a source language to a sequence in a target language, and the source and target languages may be taken from a set of languages for which the seq2seq model is pretrained, wherein one or more of the one or more languages may be in the set of languages. In addition to any of the above features in this paragraph, the seq2seq model may be pretrained for translating from a sequence in a source language to a sequence in a target language, the source and target languages may be taken from a set of languages for which the seq2seq model is pretrained, and one or more of the one or more languages may be omitted from (e.g., not in) the set of languages. In addition to any of the above features in this paragraph, the seq2seq model may be pretrained for translating from a sequence in a source language to a sequence in a target language, and the source and target languages may be taken from a set of languages for which the seq2seq model is pretrained, and each of the one or more languages may be omitted from the set of languages (e.g., none of the one or more languages is in the set of languages). In addition to any of the above features in this paragraph, the parallel data used for said fine-tuning cross-attention weights may comprise parallel translations pairing a language with a common language. In addition to any of the above features in this paragraph, said fine-tuning may fine-tune cross-attention weights of the seq2seq model on the translation task while the trained denoising adapters for all of the one or more languages are inserted into the encoder and/or the decoder. In addition to any of the above features in this paragraph, said fine-tuning may fine-tune cross-attention weights of the seq2seq model on the translation task while the trained denoising adapters for all of the one or more languages are inserted into each of the encoder and the decoder. In addition to any of the above features in this paragraph, the common language may be English. In addition to any of the above features in this paragraph, said fine-tuning cross-attention weights may be performed while freezing parameters of the inserted trained denoising adapters and parameters of the seq2seq model other than the cross-attention weights. In addition to any of the above features in this paragraph, said fine-tuning cross-attention weights may be performed while freezing all parameters of the inserted trained denoising adapters and all parameters of the seq2seq model other than the cross-attention weights. In addition to any of the above features in this paragraph, the fine-tuned cross-attention weights may be shared among all of the one or more languages. In addition to any of the above features in this paragraph, said fine-tuning may be for a translation task. In addition to any of the above features in this paragraph, the method may further comprise further fine-tuning the seq2seq model using back translation for the one or more languages. In addition to any of the above features in this paragraph, said back translation may comprise, for each language, one or more iterations comprising: translating monolingual sequences to sequences in a second language using the seq2seq model; translating the second language back to the respective language using the seq2seq model to generate back-translation data, and updating parameters of the seq2seq model using the generated back-translation data. In addition to any of the above features in this paragraph, back-translation of the seq2seq model may be omitted (e.g., so that the seq2seq model is not trained using back-translation). In addition to any of the above features in this paragraph, the method may further comprise: translating, by one or more processors, a new sequence in at least one of the one or more languages using the trained seq2seq model. In addition to any of the above features in this paragraph, the translation may be supervised. In addition to any of the above features in this paragraph, the translation may be unsupervised. Additional embodiments of the present invention provide, among other things, an apparatus for training a neural multilingual sequence-to-sequence (seq2seq) language model, the apparatus comprising: a non-transitory computer-readable medium having executable instructions stored thereon for causing a processor and a memory to execute a method according to this paragraph.

Additional embodiments of the present invention provide, among other things, an (e.g., unsupervised) fine-tuning method for a pretrained neural multilingual sequence-to-sequence (seq2seq) language model, the seq2seq model being pretrained for translating from a sequence in a source language to a sequence in a target language, the source and target languages being taken from a set of languages for which the seq2seq model is pretrained, the seq2seq model comprising one or more trained denoising adapters for each of one or more languages in the set of languages, the method comprising: inserting, in a memory accessed by one or more processors, one or more denoising adapters for a new language into an encoder and/or a decoder of the pretrained seq2seq model, the new language not being in the set of languages; and training, by one or more processors, parameters of each of the one or more denoising adapters for the new language on a language-specific denoising task using monolingual text for the new language. In addition to any of the above features in this paragraph, the method may further comprise: fine-tuning, by one or more processors, cross-attention weights of the seq2seq model on a translation task in one or more of the languages in the set of languages with parallel data while the trained denoising adapters for each of the one or more languages in the set of languages and the trained denoising adapters for the new language are inserted in the encoder and/or decoder of the seq2seq model; wherein the fine-tuning does not use parallel data for the new language. In addition to any of the above features in this paragraph, said training parameters of each of the one or more denoising adapters may be performed while freezing all parameters of the seq2seq model other than the parameters of the one or more denoising adapters and weights of an output projection layer in the seq2seq model. In addition to any of the above features in this paragraph, the seq2seq model may comprise a transformer encoder and an autoregressive transformer decoder, the transformer decoder may comprise a cross-attention layer; and said fine-tuning may comprise fine-tuning cross-attention weights of the cross-attention layer. In addition to any of the above features in this paragraph, the denoising adapters may learn language-specific encoding and decoding in the new language by denoising the monolingual texts in the new language. In addition to any of the above features in this paragraph, the denoising may comprise performing a noise function, the noise function comprising one more of: token masking, token deletion, word-span masking, sentence permutation, or document rotation. In addition to any of the above features in this paragraph, the method may further comprise: pretraining, by one or more processors, the seq2seq model, and said pretraining may comprise: inserting one or more denoising adapters for each of one or more languages in the one or more languages in the set of languages into an encoder and/or a decoder of the seq2seq model; training, by one or more processors, parameters of each of the inserted one or more denoising adapters on a language-specific denoising task using monolingual text for each of the one or more languages in the set of languages; and fine-tuning, by one or more processors, cross-attention weights of the seq2seq model on a translation task in at least one of the one or more languages in the set of languages with parallel data while the trained denoising adapters for all of the one or more languages in the set of languages are inserted in the encoder and/or decoder of the seq2seq model. Additional embodiments of the present invention provide, among other things, an apparatus for fine-tuning a pretrained neural multilingual sequence-to-sequence (seq2seq) language model, the apparatus comprising: a non-transitory computer-readable medium having executable instructions stored thereon for causing a processor and a memory to execute a method according to this paragraph.

Additional embodiments of the present invention provide, among other things, an (e.g., unsupervised) training method for adapting a multidomain translation model to a new domain T, the multilingual translation model being pre-trained for translating between a sequence in a source language and a target language in each of one or more given domains $D_1, \ldots, D_n$, the method comprising: inserting, in a memory accessed by one or more processors, denoising adapter layers for each given domain $D_1, \ldots, D_n$ into an encoder of the multilingual translation model; tuning, by one or more processors, cross-attention parameters of the multilingual translation model using data for given domains $D_1, \ldots, D_n$ on a translation task; inserting, in the memory, a new denoising adapter layer $D_T$ for the new domain T into the multilingual translation model; and training, by one or more processors, the inserted new denoising adapter layer on a denoising task using monolingual data $T_{xx}$ in the new domain T. In addition to any of the above features in this paragraph, the method may further comprise: training, by one or more processors, each of denoising adapters for each given domain $D_1, \ldots, D_n$ on a denoising task using data for the respective given domain 1 . . . n. In addition to any of the above features in this paragraph, wherein said training each of denoising adapters for each given domain $D_1, \ldots, D_n$ may comprise: inserting, in the memory, the one or more denoising adapters $D_1 \ldots D_n$ into the encoder of the pretrained multilingual translation model; and training, by one or more processors, parameters of each of the one or more denoising adapters on a domain-specific denoising task using monolingual text for each of the $D_1 \ldots D_n$ given domains. In addition to any of the above features in this paragraph, the multilingual model may comprise a transformer encoder and an autoregressive transformer decoder, the transformer decoder may comprise a cross-attention layer; said tuning cross-attention parameters learns the cross-attention layer; the transformer encoder layer may comprise a feedforward encoder layer and a self-attention layer having a plurality of attention heads; and the transformer decoder may comprise a feedforward decoder layer, a self-attention layer having a plurality of attention heads, and the cross-attention layer. In addition to any of the above features in this paragraph, the data for domains $D_1 \ldots D_n$ and for new domain T may be tagged for each respective domain. Additional embodiments of the present invention provide, among other things, an apparatus for adapting a multidomain translation model to a new domain, the apparatus comprising: a non-transitory computer-readable medium having executable instructions stored thereon for causing a processor and a memory to execute a method according to this paragraph.

Additional embodiments of the present invention provide, among other things, a system for neural multilingual machine translation in a set of languages, the system being implemented by a processor and a memory, the system comprising: a transformer encoder comprising a feedforward encoder layer and a self-attention layer having a plurality of attention heads; an autoregressive transformer decoder comprising a feedforward decoder layer, a self-attention layer having a plurality of attention heads, and a cross-attention layer; and at least one denoising adapter for each of one or more languages in the set of languages inserted into the transformer encoder and/or the transformer decoder; wherein each of the denoising adapters is trained on a language-specific denoising task for its respective language using monolingual data in the respective language; and wherein the cross-attention layer of the decoder is trained using parallel data in at least one of the one or more languages in the set of languages when the denoising adapters are inserted into the transformer encoder and/or the transformer decoder. In addition to any of the above features in this paragraph, each of the denoising adapters may comprise a normalization layer, a down projection layer, a non-linear activation function, an up-projection layer, and a residual connection combining an output of the up-projection layer with an input to the denoising adapter.

Additional embodiments of the present invention provide, among other things, an apparatus for training a neural multilingual sequence-to-sequence (seq2seq) language model, the apparatus comprising: a non-transitory computer-readable medium having executable instructions stored thereon for causing a processor and a memory to: insert one or more denoising adapters for each of one or more languages into an encoder and/or a decoder of the seq2seq model; train parameters of each of the one or more denoising adapters on a language-specific denoising task using monolingual text for each of the one or more languages; and fine-tune cross-attention weights of the seq2seq model on a translation task in at least one of the one or more languages with parallel data while the trained denoising adapters for all of the one or more languages are inserted in the encoder and/or decoder of the seq2seq model. The seq2seq language model may be pretrained.

Additional embodiments of the present invention provide, among other things, an (e.g., unsupervised) training method for a neural multilingual sequence-to-sequence (seq2seq) model having an encoder and a decoder, the method comprising: adding one or more denoising adapter layers with parameters for each of one or more languages to the encoder and/or the decoder of the seq2seq model; training the parameters of each of the one or more denoising adapter layers added to the seq2seq model on a language-specific denoising task using monolingual text for each of the one or more languages; and fine-tuning cross-attention weights of the seq2seq model with the denoising adapter layers and the trained parameters on a language translation task in at least one of the one or more languages with parallel data.

Additional embodiments of the present invention provide, among other things, a method for translating an input sequence from a first language to a second language, comprising: receiving a sequence in the first language and a neural multilingual sequence-to-sequence (seq2seq) model; and converting the sequence in the first language to a sequence in the second language using the neural multilingual sequence-to-sequence (seq2seq) model; wherein the neural multilingual sequence-to-sequence (seq2seq) model is trained by: inserting, in a memory accessed by one or more processors, one or more denoising adapters for each of the first and the second languages into an encoder and/or a decoder of the seq2seq model; training, by one or more processors, parameters of each of the one or more denoising adapters on a language-specific denoising task using monolingual text for each of the first and the second languages; and fine-tuning, by one or more processors, cross-attention weights of the seq2seq model with the denoising adapter layers and the trained parameters on a translation task in at least one of the first and the second languages with parallel data.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure. All documents cited herein are hereby incorporated by reference in their entirety, without an admission that any of these documents constitute prior art.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

The invention claimed is:

1. A method for translating a sequence, comprising:
translating, by one or more processors, a new sequence in one or more languages using a neural multilingual sequence-to-sequence (seq2seq) model, wherein the seq2seq model is trained using an unsupervised training method comprising:
inserting, in a memory accessed by one or more processors, one or more denoising adapters for each of one or more languages into an encoder and/or a decoder of the seq2seq model;
training, by one or more processors, parameters of each of the one or more denoising adapters on a language-specific denoising task using monolingual text for each of the one or more languages; and
fine-tuning, by one or more processors, cross-attention weights of the seq2seq model with the denoising adapter layers and the trained parameters on a translation task in at least one of the one or more languages with parallel data.

2. The method of claim 1, wherein the seq2seq model comprises a machine translation model.

3. The method of claim 1, wherein the seq2seq model comprises a transformer encoder and a transformer decoder, wherein the transformer decoder comprises a cross-attention layer;
wherein said fine-tuning comprises fine-tuning cross-attention weights of the cross-attention layer.

4. The method of claim 1, wherein each of the denoising adapters comprises lightweight residual layers.

5. The method of claim 1, wherein each of the denoising adapters comprises a normalization layer, a down projection layer, a non-linear activation function, an up-projection layer, and a residual connection combining an output of the up-projection layer with an input to the adapter.

6. The method of claim 1, wherein the seq2seq model is pretrained for translating from a sequence in a source language to a sequence in a target language, wherein the source and target languages are taken from a set of languages, wherein the seq2seq model has a vocabulary of tokens in each of the set of languages.

7. The method of claim 6, wherein for at least one language in the set of languages, only monolingual data is used for the language when training the seq2seq model for translating to or from a sequence in that language.

8. The method of claim 1, wherein said inserting the one or more denoising adapters comprises inserting one or more denoising adapters for each of the one or more languages into each of the encoder and the decoder of the seq2seq model.

9. The method of claim 1, wherein the encoder comprises a transformer encoder and the decoder comprises a transformer decoder, wherein the transformer decoder comprises a cross-attention layer, wherein said fine-tuning cross-attention weights learns the cross-attention layer;
wherein the transformer encoder layer comprises a feedforward encoder layer and a self-attention layer having a plurality of attention heads;
wherein the transformer decoder comprises a feedforward decoder layer, a self-attention layer having a plurality of attention heads, and the cross-attention layer;
wherein said inserting the one or more denoising adapters comprises inserting one or more denoising adapter layers for each of the one or more languages into each of the transformer encoder and the transformer decoder following self-attention and feedforward layers;
wherein the output of the transformer encoder is fed to the cross-attention layer of the transformer decoder.

10. The method of claim 1, wherein said training parameters of the one or more denoising adapters for each language uses only monolingual texts for each of the one or more languages.

11. The method of claim 1, wherein the denoising adapters learn language-specific encoding and decoding in each of the one or more languages by denoising the monolingual texts in each respective language.

12. The method of claim 11, wherein the denoising comprises performing a noise function on the monolingual text, the noise function comprising one or more of: token masking, token deletion, word-span masking, sentence permutation, or document rotation.

13. The method of claim 1, wherein said training parameters of each of the one or more denoising adapters is performed while freezing other parameters of the seq2seq model.

14. The method of claim 1, wherein said training parameters of each of the one or more denoising adapters is performed while freezing all parameters of the seq2seq model other than the parameters of the one or more denoising adapters.

15. The method of claim 1, wherein said training parameters of each of the one or more denoising adapters is performed while freezing all parameters of the seq2seq model other than the parameters of the one or more denoising adapters and weights of an output projection layer in the seq2seq model.

16. The method of claim 1, wherein the seq2seq model is pretrained for translating from a sequence in a source language to a sequence in a target language, wherein the source and target languages are taken from a set of languages for which the seq2seq model is pretrained, and wherein one or more of the one or more languages is not in the set of languages.

17. The method of claim 1, wherein the parallel data used for said fine-tuning cross-attention weights comprises parallel translations pairing a language with a common language.

18. The method of claim 1, wherein said fine-tuning finetunes cross-attention weights of the seq2seq model on the translation task while the trained denoising adapters for all of the one or more languages are inserted in the encoder and/or decoder.

19. The method of claim 18, wherein said fine-tuning cross-attention weights is performed while freezing parameters of the inserted trained denoising adapters and parameters of the seq2seq model other than the cross-attention weights.

20. The method of claim 1, wherein the fine-tuned cross-attention weights are shared among all of the one or more languages.

21. The method of claim 1, wherein said fine-tuning is for a translation task.

22. The method of claim 1, further comprising:
further fine-tuning the seq2seq model using back translation for the one or more languages.

23. The method of claim 1, wherein the seq2seq model is not trained using back-translation.

24. The method of claim 1, wherein the translation is supervised.

25. The method of claim 1, wherein the translation is unsupervised.

26. A method for translating a sequence comprising:
translating, by one or more processors, a new sequence in one or more languages using a pretrained neural multilingual sequence-to-sequence (seq2seq) language model, the seq2seq model being pretrained for translating from a sequence in a source language to a sequence in a target language, wherein the source and target languages are taken from a set of languages for which the seq2seq model is pretrained, the seq2seq model comprising one or more trained denoising adapters for each of one or more languages in the set of languages, wherein the seq2seq model is fine-tuned using an unsupervised fine-tuning method comprising:
inserting, in a memory accessed by one or more processors, one or more denoising adapters for a new language into an encoder and/or a decoder of the pretrained seq2seq model, the new language not being in the set of languages; and
training, by one or more processors, parameters of each of the one or more denoising adapters for the new language on a language-specific denoising task using monolingual text for the new language.

27. The method of claim 26, further comprising:
fine-tuning, by one or more processors, cross-attention weights of the seq2seq model on a translation task in one or more of the languages in the set of languages with parallel data while the trained denoising adapters for each of the one or more languages in the set of languages and the trained denoising adapters for the new language are inserted in the encoder and/or decoder of the seq2seq model;
wherein fine-tuning does not use parallel data for the new language.

28. The method of claim 26, wherein said training parameters of each of the one or more denoising adapters is performed while freezing all parameters of the seq2seq model other than the parameters of the one or more denoising adapters and weights of an output projection layer in the seq2seq model.

29. The method of claim 26, wherein the seq2seq model comprises a transformer encoder and an autoregressive transformer decoder, wherein the transformer decoder comprises a cross-attention layer;
wherein the method further comprises:
fine-tuning, by one or more processors, cross-attention weights of the seq2seq model on a translation task in one or more of the languages in the set of languages with parallel data while the trained denoising adapters for each of the one or more languages in the set of languages and the trained denoising adapters for the new language are inserted in the encoder and/or decoder of the seq2seq model;

wherein said fine-tuning comprises fine-tuning cross-attention weights of the cross-attention layer.

30. The method of claim 26, wherein the denoising adapters learn language-specific encoding and decoding in the new language by denoising the monolingual texts in the new language.

31. The method of claim 30, wherein the denoising comprises performing a noise function, the noise function comprising one more of: token masking, token deletion, word-span masking, sentence permutation, or document rotation.

32. The method of claim 26, further comprising:
pretraining, by one or more processors, the seq2seq model, wherein said pretraining comprises:
inserting one or more denoising adapters for each of one or more languages in the one or more languages in the set of languages into an encoder and/or a decoder of the seq2seq model;
training, by one or more processors, parameters of each of the inserted one or more denoising adapters on a language-specific denoising task using monolingual text for each of the one or more languages in the set of languages; and
fine-tuning, by one or more processors, cross-attention weights of the seq2seq model on a translation task in at least one of the one or more languages in the set of languages with parallel data while the trained denoising adapters for all of the one or more languages in the set of languages are inserted in the encoder and/or decoder of the seq2seq model.

33. A method for translating an input sequence from a first language to a second language, comprising:
receiving a sequence in the first language and a neural multilingual sequence-to-sequence (seq2seq) model; and
converting the sequence in the first language to a sequence in the second language using the neural multilingual sequence-to-sequence (seq2seq) model;
wherein the neural multilingual sequence-to-sequence (seq2seq) model is trained by:
inserting, in a memory accessed by one or more processors, one or more denoising adapters for each of the first and the second languages into an encoder and/or a decoder of the seq2seq model;
training, by one or more processors, parameters of each of the one or more denoising adapters on a language-specific denoising task using monolingual text for each of the first and the second languages; and
fine-tuning, by one or more processors, cross-attention weights of the seq2seq model with the denoising adapter layers and the trained parameters on a translation task in at least one of the first and the second languages with parallel data.

* * * * *